US012085336B2

(12) United States Patent
Van Der Wel et al.

(10) Patent No.: US 12,085,336 B2
(45) Date of Patent: Sep. 10, 2024

(54) DRYING DEVICE, ROTARY VALVE AND DRYING METHOD

(71) Applicant: HOSOKAWA MICRON B.V., Doetinchem (NL)

(72) Inventors: Peter Gerardus Josephus Van Der Wel, Doetinchem (NL); Albert Kaptein, Doetinchem (NL); Markus Krumme, Doetinchem (NL); Thomas Karl Michael Mannschott, Doetinchem (NL); Isabella Patrizia Aigner, Doetinchem (NL); Manuel Philipp Zettl, Doetinchem (NL); Manuel Kreimer, Doetinchem (NL)

(73) Assignee: HOSOKAWA MICRON B.V., Doetinchem (NL)

( * ) Notice: Subject to any disclaimer, the term of this patent is extended or adjusted under 35 U.S.C. 154(b) by 163 days.

(21) Appl. No.: 17/046,914

(22) PCT Filed: Apr. 10, 2019

(86) PCT No.: PCT/NL2019/050213
§ 371 (c)(1),
(2) Date: Oct. 12, 2020

(87) PCT Pub. No.: WO2019/199166
PCT Pub. Date: Oct. 17, 2019

(65) Prior Publication Data
US 2021/0148634 A1    May 20, 2021

(30) Foreign Application Priority Data
Apr. 10, 2018  (NL) ...................... 2020740

(51) Int. Cl.
F26B 3/20    (2006.01)
F26B 5/04    (2006.01)
F26B 25/04   (2006.01)

(52) U.S. Cl.
CPC ............... *F26B 3/20* (2013.01); *F26B 5/041* (2013.01); *F26B 25/04* (2013.01)

(58) Field of Classification Search
CPC ...... F26B 3/20; F26B 3/24; F26B 3/18; F26B 3/22; F26B 5/041; F26B 25/04;
(Continued)

(56) References Cited

U.S. PATENT DOCUMENTS 991,679 A      5/1911  Weiss
1,539,649 A *  5/1925  Christie ............... F26B 11/045
                                                      34/92

(Continued)

FOREIGN PATENT DOCUMENTS

DE    521619 C      3/1931
DE    3724121 A1    2/1989
(Continued)

OTHER PUBLICATIONS

International Search Report and Written Opinion from corresponding PCT Application No. PCT/NL2019/050213, dated Aug. 16, 2019.
(Continued)

*Primary Examiner* — John P McCormack
(74) *Attorney, Agent, or Firm* — Workman Nydegger

(57) ABSTRACT

The invention relates to a drying device for drying a product comprising: a housing having a drying chamber, a product inlet at a first end and an product outlet at a second end; a drying rotor arranged rotatable within the drying chamber and having at least one helical groove at the outer surface thereof; a screw having a flight with a flight channel there
(Continued)

between and arranged rotatable within the drying chamber and substantially parallel to the drying rotor; a driving mechanism configured for driving the screw in rotation around a screw axis; and a heater for providing thermal energy to the drying chamber, wherein the drying rotor and/or the screw at least are configured for moving the product from the first end to the second end, and such that the flight of the screw engages into the at least one helical groove of the drying rotor.

20 Claims, 17 Drawing Sheets

(58) Field of Classification Search
CPC ...... F26B 17/20; F26B 11/0445; F26B 13/18; B65G 33/18; B65G 33/24; B65G 45/005; F16K 1/40; F16K 41/046
USPC ......... 34/217, 185, 184, 519, 147, 179, 236; 251/249.5, 126
See application file for complete search history.

(56) References Cited

U.S. PATENT DOCUMENTS

| | | | |
|---|---|---|---|
| 2,658,604 A | | 11/1953 | Erdmenger et al. |
| 2,869,715 A | * | 1/1959 | Williams ............... B65G 33/18 198/545 |
| 3,775,041 A | | 11/1973 | Buttner |
| 4,330,946 A | | 5/1982 | Courneya |
| 4,750,274 A | * | 6/1988 | Erdman, Jr. ............ F26B 3/205 34/182 |

FOREIGN PATENT DOCUMENTS

| | | | |
|---|---|---|---|
| JP | S55-031476 A | | 3/1980 |
| JP | 6354498 | * | 4/1988 |
| JP | S63-054498 U | | 4/1988 |
| JP | 174125 C | | 5/1989 |
| JP | H0539129 A | | 2/1993 |
| JP | 2012163256 A | | 8/2012 |
| SU | 1460564 A1 | | 2/1989 |
| WO | 2007145187 A1 | | 12/2007 |

OTHER PUBLICATIONS

Search Report from corresponding Netherlands Application No. NL2020740, dated Sep. 28, 2018.
International Preliminary Report on Patentability from corresponding PCT Application No. PCT/NL2019/050213, dated Jul. 21, 2020.
Japanese Office Action from Corresponding Japanese Patent Application No. 2020-556298, Feb. 17, 2023.

* cited by examiner

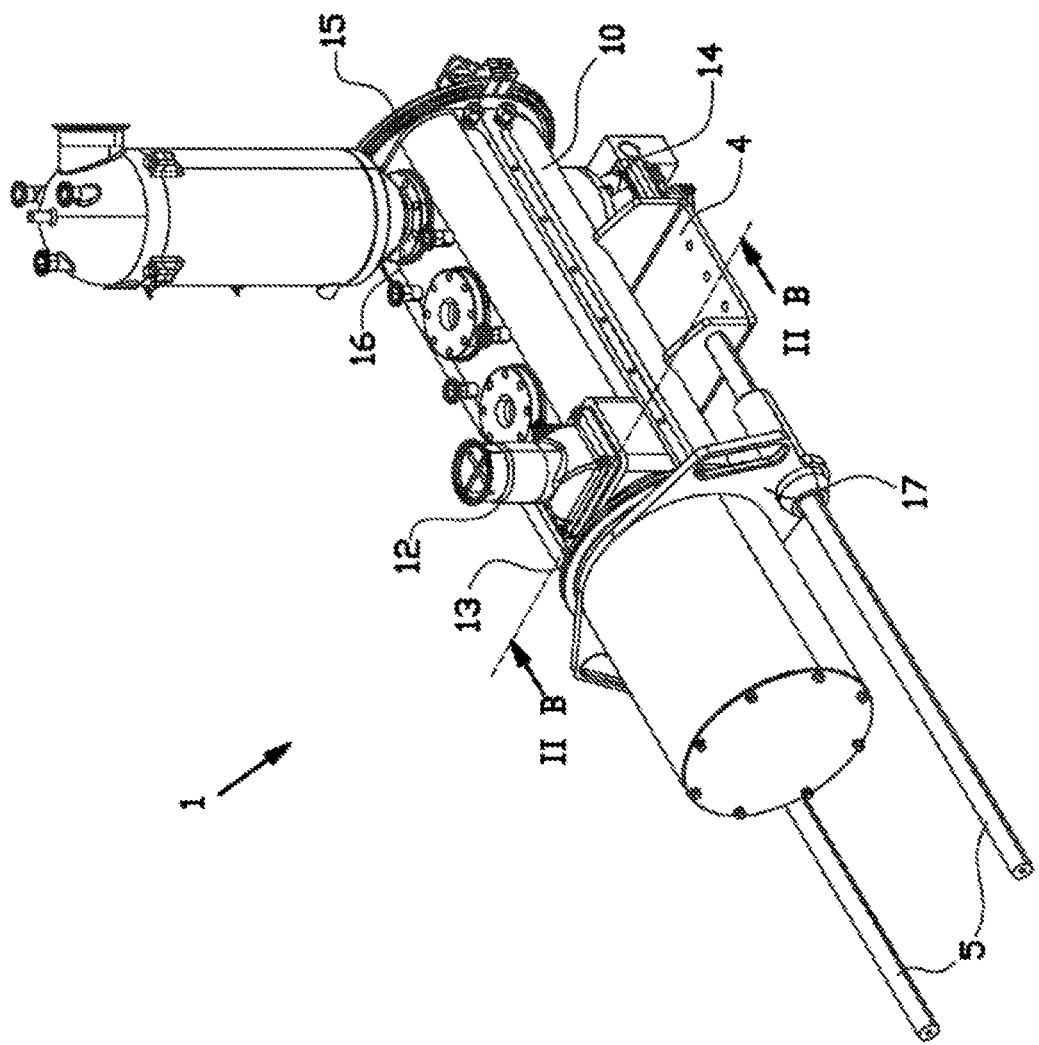

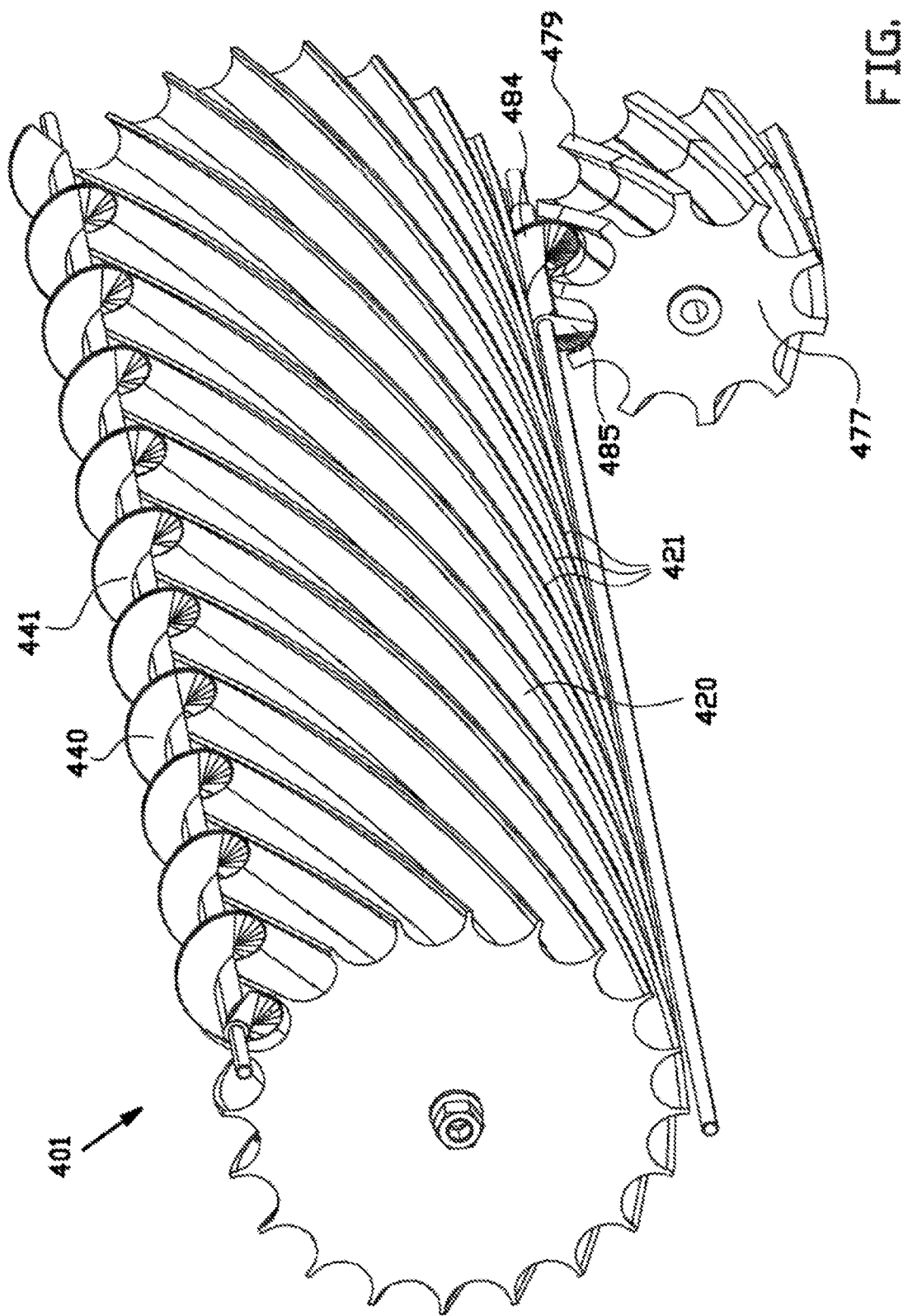

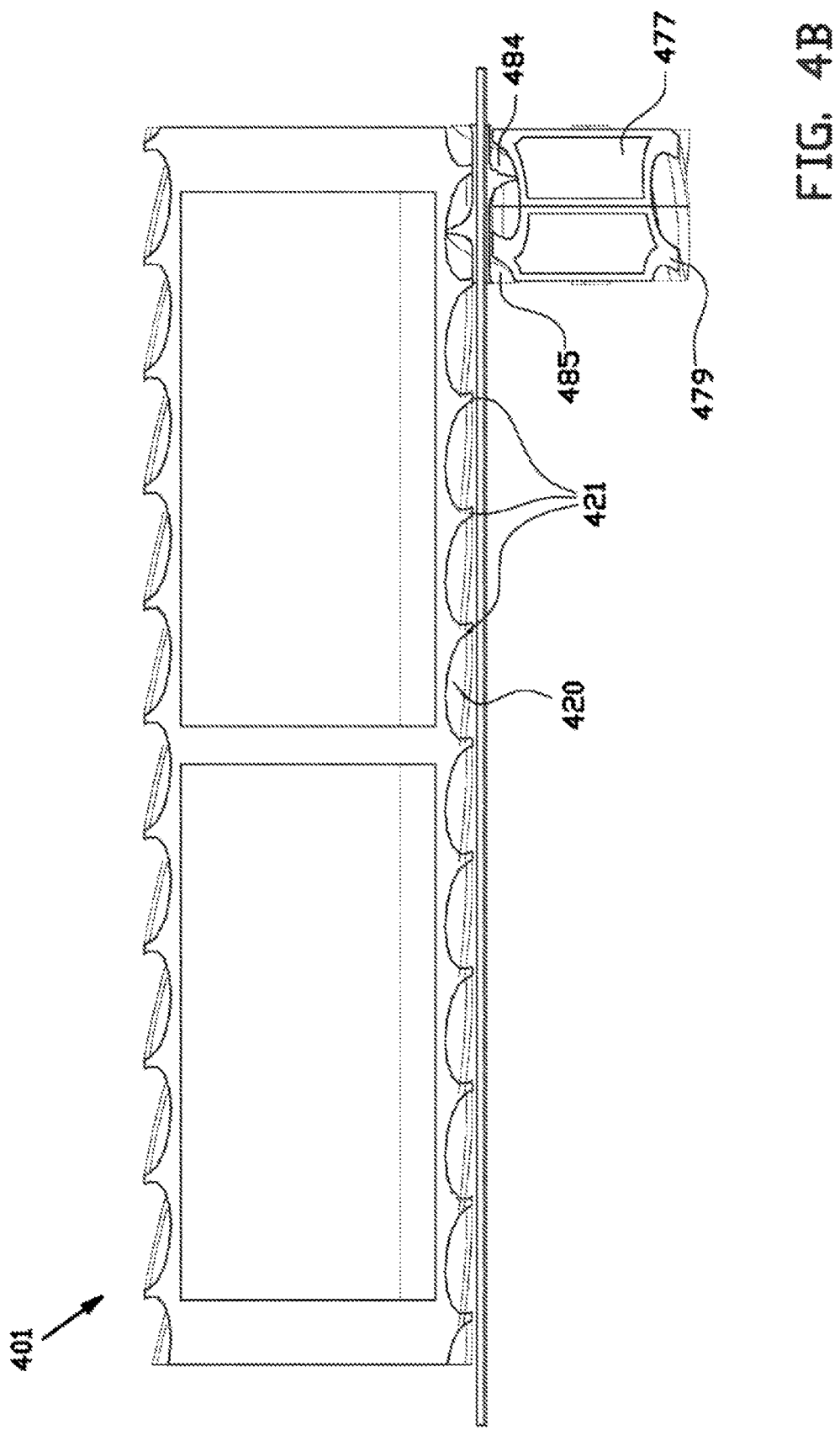

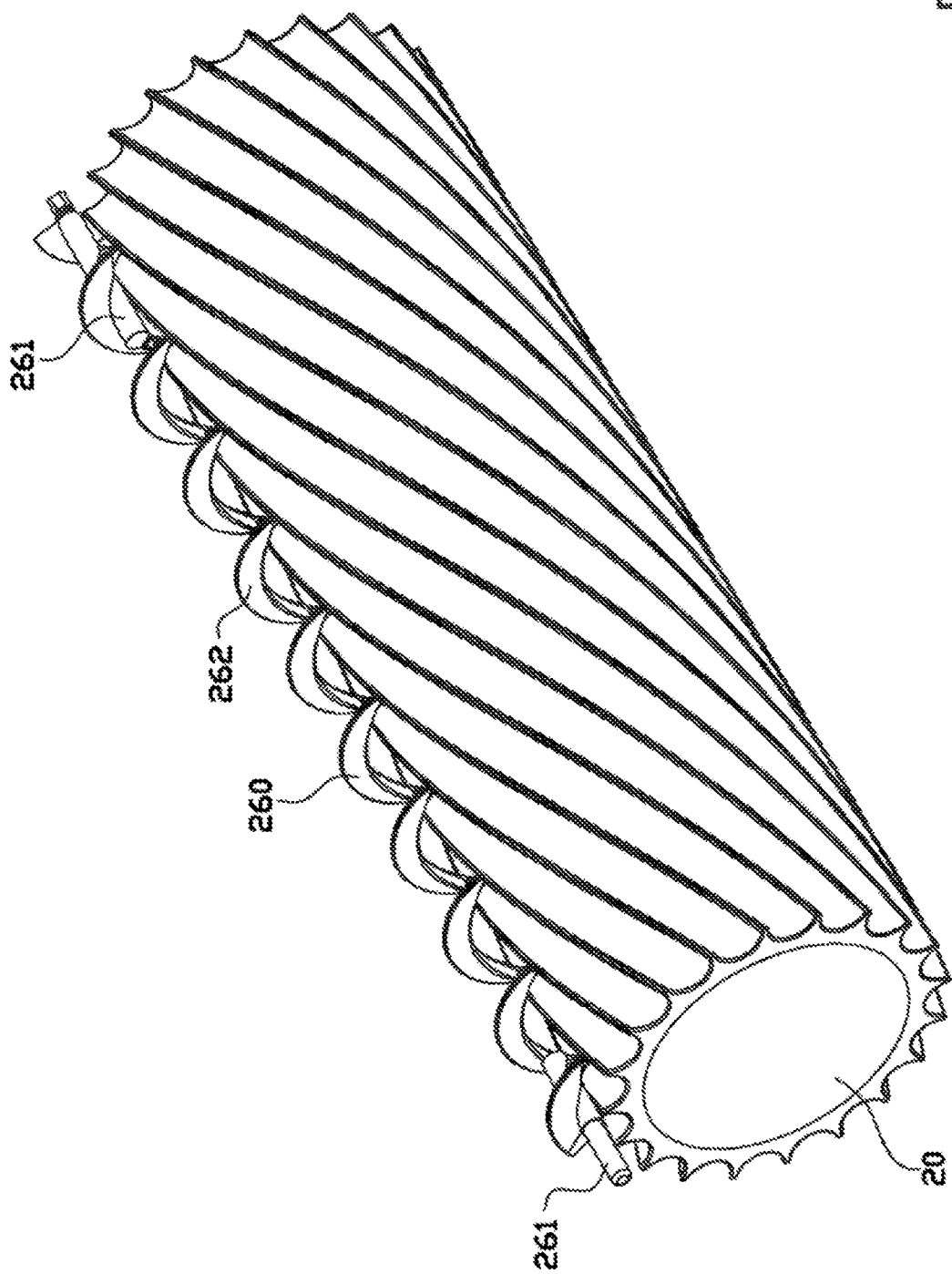

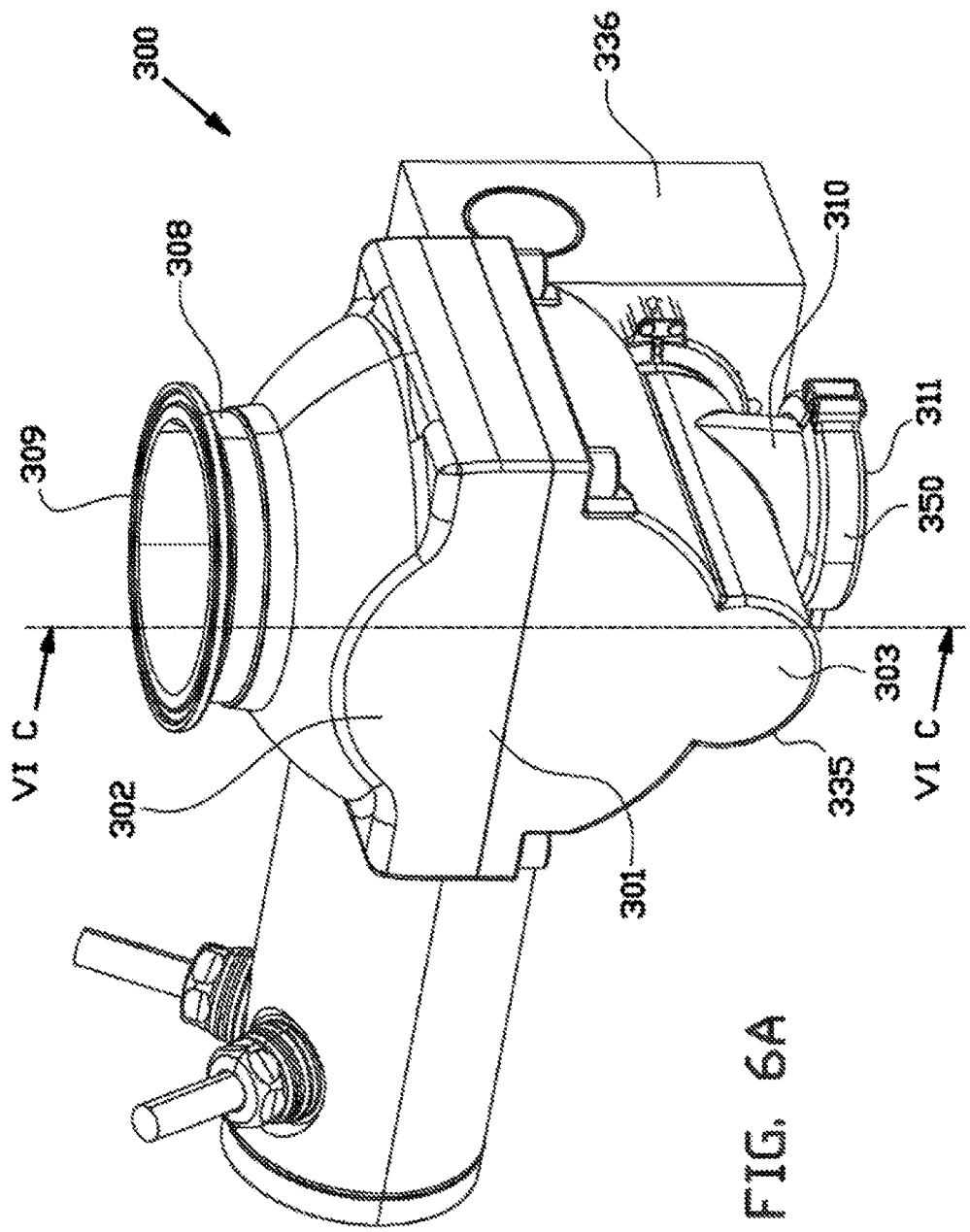

DRYING DEVICE, ROTARY VALVE AND
DRYING METHOD

BACKGROUND

The invention relates to a drying device for drying a product, and a drying method for drying a product, such as a pharmaceutical product. Further, the invention relates to a rotary valve.

Such a drying device is known, for example, from United States patent publication U.S. Pat. No. 3,777,810. The drying device is configured for drying moist solid material, and is of the type utilizing disc heat exchange elements into which a heating fluid is introduced and cooled fluid is withdrawn, the material being dried through contact with a plurality of discs in its passage through the drying device. The disc heat exchange elements are torus discs formed from relatively thin-walled circular metal plates for good heat transfer to the material and having a plurality of concentric rings of convex arcuate cross section for strength. The disc heat exchange element encloses a plurality of interconnected concentric generally toroidal chambers through which heating fluid, such as steam, is circulated successively and from the outermost of which cooled fluid, such as condensate, is withdrawn.

The drying device also has a housing with a drying chamber including a material inlet at one end and a material discharge at the other end. The material is agitated and moved through the housing by means of the disc heat exchange elements, through which the heating fluid circulates, wherein the material is contacted to remove moisture from the same.

SUMMARY OF THE INVENTION

The inventor has found that during use of the known disc dryer for drying small amounts of product, the product is not moved through the drying device and, therefore, remains on the bottom. A disadvantage of the known disc dryer is that the disc dryer is inefficient at drying small amounts of product.

It is an object of the present invention to ameliorate or to eliminate one or more disadvantages of the known drying device, or to at least provide an alternative drying device.

According to a first aspect, the invention provides a drying device for drying a product, wherein the drying device comprises:
a housing having a drying chamber defined therein, and having a product inlet at a first end and an product outlet at a second end;
a drying rotor being arranged rotatable within the drying chamber, wherein the drying rotor has at least one helical groove or at least one helical notch at the outer surface thereof;
a screw having a flight with a flight channel there between, wherein the screw is arranged rotatable within the drying chamber and substantially parallel to the drying rotor;
a driving mechanism operatively connected to at least the screw, which driving mechanism is configured for driving the screw in rotation; and
a heater for providing thermal energy to at least a part of the drying chamber in order to dry the product present within the drying chamber,
wherein the drying rotor and/or the screw at least are configured for moving the product from the first end to the second end,
wherein the screw and the drying rotor are configured such that the flight of the screw engages into the at least one helical groove of the drying rotor or such that the at least one helical notch engages into the flight channel of the screw, and
wherein the screw and the drying rotor are configured such that, during use, the screw scrapes over the surface of the at least one helical groove or the at least one helical notch.

During use of the drying device according to the invention, a product to be dried is introduced into the drying chamber via the product inlet. Subsequently, the product is moved through the drying chamber by means of the rotating drying rotor and the rotating screw. During movement of the product through the drying chamber, thermal energy is provided to the drying chamber in order to heat the product within the drying chamber. By heating the product within the drying chamber, moisture is removed from the product such that the product is dried or substantially dried when it reaches the product outlet. The product within the drying chamber is at least agitated within the drying chamber by the at least one groove or at least one notch of the drying rotor. The inventor has found that such drying rotor with groove or notch is capable of agitating and moving a small amount of product within the drying chamber. By agitating and moving the product within the drying chamber, a dried or at least substantially dried product will be discharged at the product outlet. The drying device according to the invention, thus, is capable of drying small amounts of product.

Additionally, by providing the drying rotor with at least one groove or at least one notch, the drying rotor has an increased outer surface for contacting the product.

It is noted that in the context of the present patent application, product has to be understood as relating to filter cakes, powders, viscous materials and/or granules. Additionally, product to be dried has to be understood as any kind of product, such as a pharmaceutical product or food product.

Moreover, during drying of the product, wet product can stick to the outer surface of the drying rotor. Product stuck to the drying rotor may cause clumping of the product or may reduce the efficiency of the drying device. Due the screw being engaged into the at least one helical groove or the at least one helical notch being engaged into the screw channel, rotational movement of the screw causes the screw to scrape over the surface of the at least one helical groove or the at least one helical notch, or at least a part thereof. Product stuck to the outer surface, of the at least one helical groove or notch, is thereby removed from the outer surface, such that clumping is reduced or in the ideal case eliminated. Additionally, the efficiency of the drying device is improved.

Furthermore, in the context of the present patent application, the term "notch" has to be understood to correspond to a ridge or a nock.

In an embodiment the screw and the drying rotor are configured such that the drying rotor is driven in rotation by the screw when the screw is driven in rotation. During use, the screw is driven in rotation by means of the driving mechanism operatively connected thereto. Because of the screw being engaged into the at least one helical groove or the at least one helical notch being engaged into the screw channel, rotational movement of the screw will be transmitted to the drying rotor. The drying rotor, therefore, can be driven in rotation by the screw, such that only the screw has to be operatively connected to the driving mechanism. This is advantageous as only one driving mechanism is needed for driving both the drying rotor and the screw.

In an embodiment the drying rotor is configured to move the product in rotation around a rotor axis parallel to the screw axis, and wherein the screw is configured to push the product in a direction from the first end to the second end. During use, the product is moved, at least, in rotation by the drying rotor within the drying chamber. During rotation, the product passes the screw arranged substantially parallel or parallel to the drying rotor. Due to the screw being engaged into the at least one helical screw or the at least one helical notch being engaged into the flight channel of the screw, the product contacts the flight, preferably the pushing flight, of the screw. Upon contact, the flight of the screw pushes the product towards the second end. After being pushed forward, the product can make a next rotational movement through the drying chamber, after which the product contacts the screw again and can be pushed towards the second end again. By moving the product through the drying chamber in this manner, the stay of the product within the drying device can be extended, therewith increasing the efficiency of the drying device.

In an embodiment the at least one helical groove has a groove depth, or the at least one helical notch has a notch height, and the screw has a channel depth, wherein the groove depth or the notch height is substantially equal to the channel depth. As the groove depth/notch height is substantially equal to the channel depth of the screw, the screw is enabled to reach the bottom of the groove or the top of the notch. Therefore, the groove/notch can be contacted by the screw at substantially the complete surface thereof, such that during use, for example, all product present within the groove or at the notch can be scraped from the surface at the location where the screw contacts the drying rotor. This is advantageous since it is prevented that product remains stuck to the drying rotor.

In an embodiment the drying rotor has an upper part and a lower part and the drying chamber is substantially trough-shaped. Preferably the lower and/or upper part of the drying rotor is tightly enclosed by the drying chamber. In an embodiment thereof the screw is arranged adjacent to the upper part of the drying rotor. The lower and/or upper part of the drying rotor being tightly enclosed by the trough-shaped drying chamber has to be understood as a gap between the outer surface of the drying rotor, at least the lower and/or upper part thereof, and walls of the drying chamber is kept to a minimum. During use, the groove or the notch scrapes over the surface of the walls thereby removing material optionally stuck to the walls of the drying chamber or laying at the bottom of the drying chamber. It is thus prevented advantageously that material remains stuck to the wall(s) of the drying chamber.

In an embodiment the drying device comprises an additional screw having an additional flight with an additional flight channel there between, wherein the additional screw is arranged rotatable within the drying chamber and substantially parallel to the drying rotor. In an embodiment thereof the additional screw is arranged adjacent to the upper part of the drying rotor. Preferably the additional screw is arranged remote from the screw. The additional screw can perform the same or another function as the screw arranged within the drying chamber. An advantage of providing the additional screw is that the load on the screw can be alleviated or the function of the screw can be complemented.

In an embodiment the screw and/or the additional screw are selected from the group comprising a screw with full pitch segments, a screw with half pitch segments, and a screw with three quarter pitch segments. In an embodiment thereof the screw and the additional screw are both a screw with three quarter pitch segments. By providing a screw with partially open pitch segments, the product or at least a part thereof is enabled to pass (through) the screw, in particular in a direction transversal to the longitudinal direction of the screw, substantially without being moved towards the product outlet by the screw. The ratio between the open area and the closed area of the pitch segments, at least partially, relates to a duration of stay of the product within the drying chamber. An advantage of this embodiment is that the stay of the product within the drying device can be extended or shortened in order to sufficiently dry the product. An extended stay has as an advantage that an extended period of time is available for drying the product.

In an embodiment the flight of the screw and/or the additional flight of the additional screw have a helix angle, wherein the helix angle is an acute angle. The helix angle being an acute angle has as an advantage that the product is pushed from the first end to the second end over a larger or smaller distance, which among others is determined by the helix angle. Thus, by varying the helix angle of the screw, the distance over which the product is moved by the screw or the additional screw, every time the product passes the screw or the additional screw, can be adjusted.

In the context of the present patent application, an acute angle has to be understood as an angle larger than 0 degrees and smaller than 90 degrees.

It is noted that the at least one helical groove or the at least on helical notch of the drying rotor is under a rotor angle with respect to a longitudinal axis of the drying rotor. In an embodiment, the rotor angle is larger than the helix angle. An advantage of this embodiment is that the screw can be used for driving the drying rotor in rotation, when the screw is driven in rotation by the driving mechanism.

In an embodiment the drying device comprises at least one rotary valve provided at the product inlet and/or the product outlet of the drying device. An advantage of providing a rotary valve at the product inlet and the product outlet is that the drying device can operate in vacuum, or at least a vacuum can be applied within the drying chamber.

In an embodiment thereof the rotary valve comprises a valve housing with a product inlet, wherein the housing has a substantially cylindrical chamber defined therein, and a valve rotor arranged rotatable within the substantially cylindrical chamber, wherein the valve rotor is provided with a plurality of helical grooves at the outer surface thereof. In an embodiment thereof, when the rotary valve is placed at the inlet of the drying device, the rotary valve is positioned such that the screw engages into at least one of the helical grooves of the valve rotor. As the screw engages into at least one of the helical grooves of the valve rotor, the screw can be used for driving the valve rotor in rotation and/or for removing product within the at least one helical groove from the rotary valve. An advantage of this embodiment is that one screw, for example, can be used for driving the drying rotor and the valve rotor. The drying device is therewith kept mechanically simple.

In an embodiment, when the rotary valve is placed at the product outlet of the drying device, the rotary valve further comprises a valve screw having a valve flight with a valve flight channel there between, and a valve driving mechanism operatively connected to the valve screw and configured for driving the valve screw in rotation, wherein the valve screw is arranged rotatable within the valve housing and substantially parallel to the valve rotor, wherein the valve screw and the valve rotor are configured such that the valve flight of the valve screw engages into at least one helical groove of the valve rotor. According to this embodiment, the valve rotor can be driven in rotation by means of the valve screw while the valve screw scrapes product from at least one of the helical grooves of the valve rotor. An advantageous of this embodiment is that driving the valve rotor and scraping the helical grooves of the valve rotor is accomplished by the valve screw, whereby the rotary valve has a relatively simple mechanical construction.

Optionally, the valve screw can be positioned such that the valve screw engages into at least one helical groove of the valve rotor, and is in engagement with the at least one helical groove of helical notch of the drying rotor. The valve screw, then, can be used for scraping the, in particular dried, product from the drying rotor, such that the product, in particular the dried product, is prevented from remaining stuck to the drying rotor when it has been moved through the drying chamber.

In an embodiment the drying rotor has a rotor diameter and the screw has a screw diameter, wherein the rotor diameter is larger than the screw diameter. In an embodiment thereof the heater is provided at least partially within the drying rotor. Preferably the heater comprises fluid conduits provided within the drying rotor and configured for being connected to a heat exchange fluid source. During use, the product within the drying device is dried by thermal energy provided by the heater. As the heater is provided within the drying rotor which has a larger diameter compared to the screw, a large heat exchange surface is provided within the drying device. A large heat exchange surface is advantageous for the efficiency of the drying device.

It is noted that in the context of the present patent application, any suitable heater, for example an electric heating spiral or an inductive heater, can be used.

In an embodiment the drying rotor comprises a plurality of helical grooves arranged at the outer surface thereof and adjacent to each other. The plurality of helical grooves at the outer surface of the drying rotor increases the outer surface of the drying rotor. In the case that the heater is provided within the drying rotor, a large heat exchange surface is provided by the drying rotor. This is advantageous for the efficiency of the drying device.

In an embodiment the heater is provided at least partially around the drying chamber.

In an embodiment the drying device comprises an additional driving mechanism operatively connected to the drying rotor, wherein the additional driving mechanism is configured for driving the drying rotor in rotation. An advantage of this embodiment is that the screw is prevented from physically contacting the drying rotor, or vice versa, therewith preventing that the product within the drying chamber becomes damaged by being trapped between the screw and the drying rotor. Further, since the screw is prevented from physically contacting the drying rotor, or vice versa, substantially no friction will occur between the screw and the drying rotor, therewith preventing particles from loosening from the screw/drying rotor due to frictional contact there between. After all, such loosened particles are a contamination for the product within the drying device.

According to a second aspect, the invention provides a rotary valve comprising:

a housing having a product inlet and a product outlet, wherein a substantially cylindrical chamber is defined within the housing and between the product inlet and the product outlet;

a valve rotor arranged rotatable within the substantially cylindrical chamber, wherein the valve rotor is provided with a plurality of helical grooves at the outer surface thereof;

a valve screw having a valve flight with a valve flight channel there between, wherein the valve screw is arranged rotatable within the substantially cylindrical chamber and substantially parallel to the valve rotor; and a valve driving mechanism operatively connected to the valve screw, wherein the valve driving mechanism is configured for driving the valve screw in rotation, wherein the valve screw and the valve rotor are configured such that the valve flight of the valve screw engages into at least one helical groove of the valve rotor, and wherein the valve screw and the valve rotor are configured such that, during use, the valve screw scrapes over the surface of at least one helical groove.

During use of the rotary valve, wet product can stick to the outer surface of the valve rotor. Product stuck to the valve rotor may cause clumping of the product or may reduce the efficiency of the rotary valve. Due the valve screw being engaged into the at least one helical groove, rotational movement of the valve screw causes the valve screw to scrape over the surface the at least one helical groove, or at least a part thereof. Product stuck to the outer surface, of the at least one helical groove, of the valve rotor is thereby removed from the outer surface, such that clumping is reduced or in the ideal case eliminated. Additionally, the efficiency of the valve rotor is improved.

In an embodiment the valve screw and the valve rotor are configured such that the valve rotor is driven in rotation by the valve screw when the valve screw is driven in rotation. Thus, the valve rotor can be driven in rotation by means of the valve screw while the valve screw scrapes product from at least one of the helical grooves of the valve rotor. An advantageous of this embodiment is that driving the valve rotor and scraping the helical grooves of the valve rotor is accomplished by the single valve screw, whereby the rotary valve has a relatively simple mechanical construction.

In an embodiment the valve screw is arranged between the valve rotor and the product outlet.

In an embodiment the rotary valve comprises an additional valve driving mechanism operatively connected to the valve rotor, wherein the additional valve driving mechanism is configured for driving the valve rotor in rotation.

According to a third aspect, the invention provides a method for drying a product by means of a drying device according to the first aspect of the invention, wherein the method comprises the steps of:

introducing a product to be dried into the drying chamber of the drying device;

moving and agitating the product with the drying chamber in a direction from the product inlet to the product outlet, while thermal energy is provided to at least a part of the drying chamber; and discharging dried product from the product outlet, wherein the step of moving and agitating the product within the drying chamber comprises the step of scraping over the surface of the at least one helical groove or the at least one helical notch by means of the screw.

The method according to the invention has at least the same advantages as mentioned in relation to the drying device according to the first aspect of the invention.

In an embodiment the step of moving and agitating the product within the drying chamber comprises the step of driving the screw in rotation.

In an embodiment the step of moving and agitating the product within the drying chamber comprises the step of forcing the product in a direction from the first end to the second end by means of the screw.

The various aspects and features described and shown in the specification can be applied, individually, wherever possible. These individual aspects, in particular the aspects and features described in the attached dependent claims, can be made subject of divisional patent applications.

BRIEF DESCRIPTION OF THE DRAWINGS

The invention will be elucidated on the basis of exemplary embodiments shown in the attached drawings, in which:

FIG. 1A-1C show a perspective view of a drying device according to an embodiment of the invention, an exploded view of the drying device with a drying rotor and a screw, and a schematic overview of the drying rotor, the screw and a valve rotor;

FIGS. 4A-4B show an isometric view of the drying rotor, a screw and a valve rotor of a drying device according to another embodiment of the invention, and a cross-section according to plane IVB, respectively;

FIGS. 5A-5F show different embodiments of screws to be used in a drying device according to the invention; and FIGS. 6A-6C show a perspective view of a rotary valve according to an embodiment of the invention, an exploded view of the rotary valve with a rotor and a screw, and a cross-section view of the rotary valve according to plane 6C in FIG. 6A.

DETAILED DESCRIPTION OF THE INVENTION

Figure 1B:
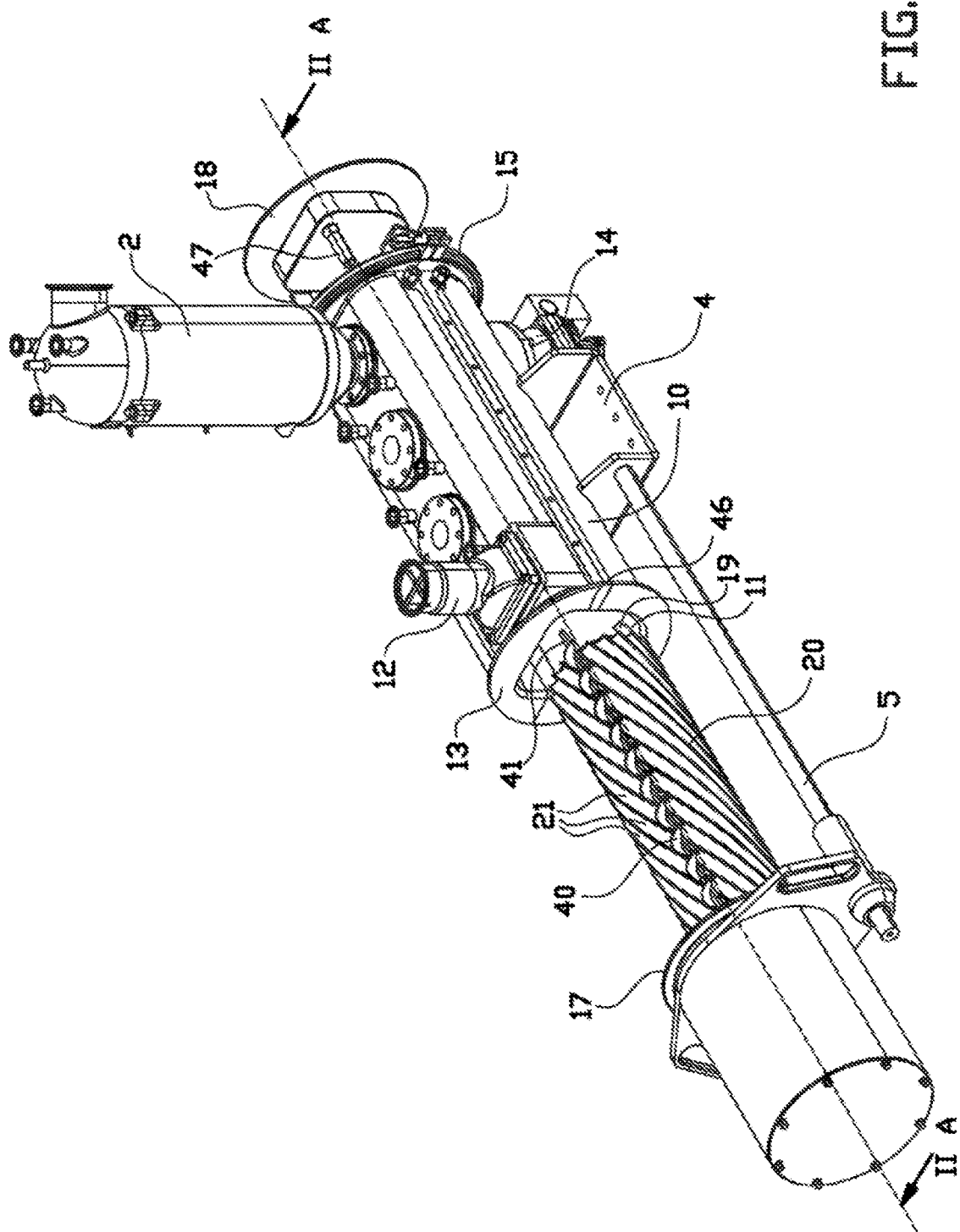
Figure 1C:
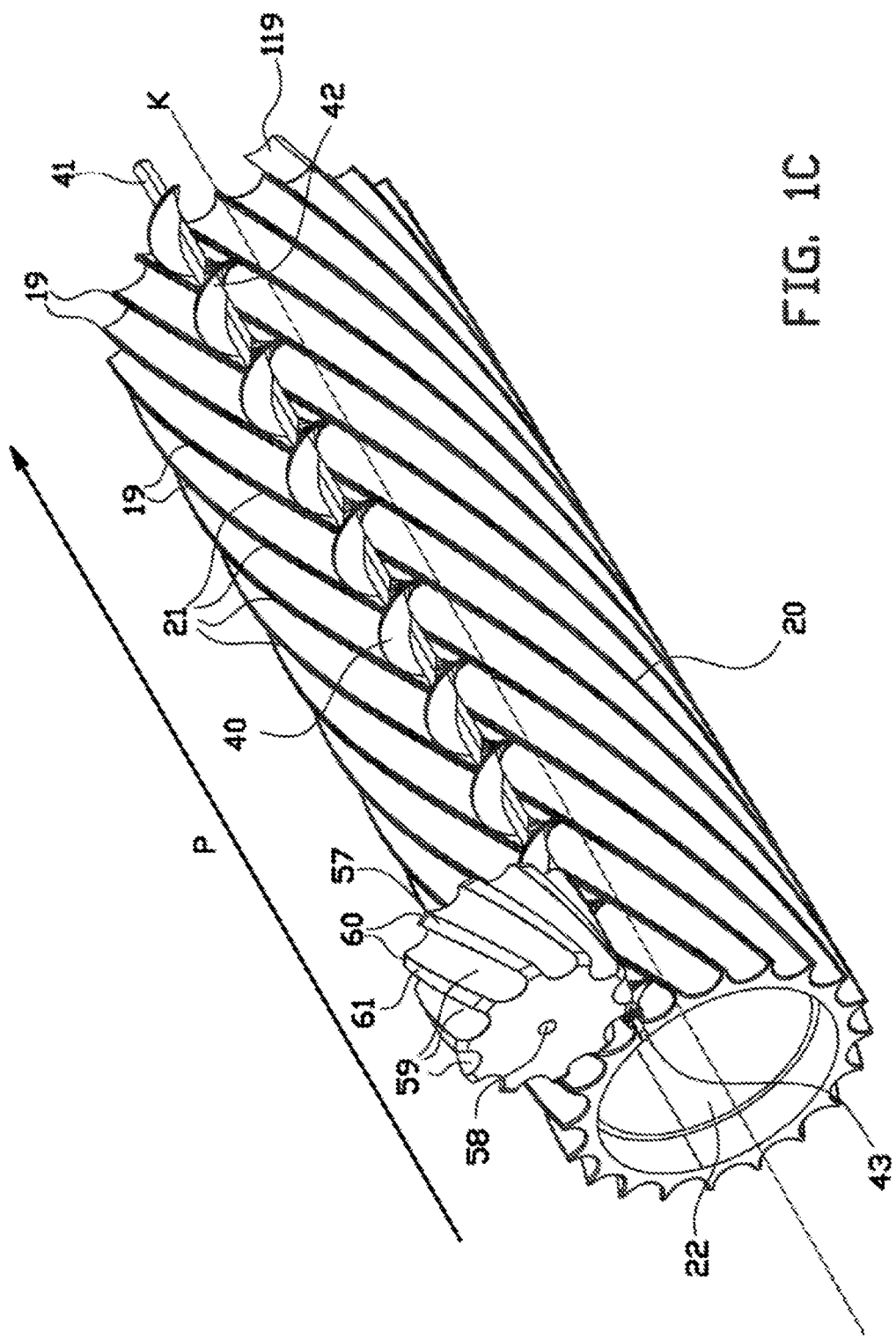
Figure 2A:
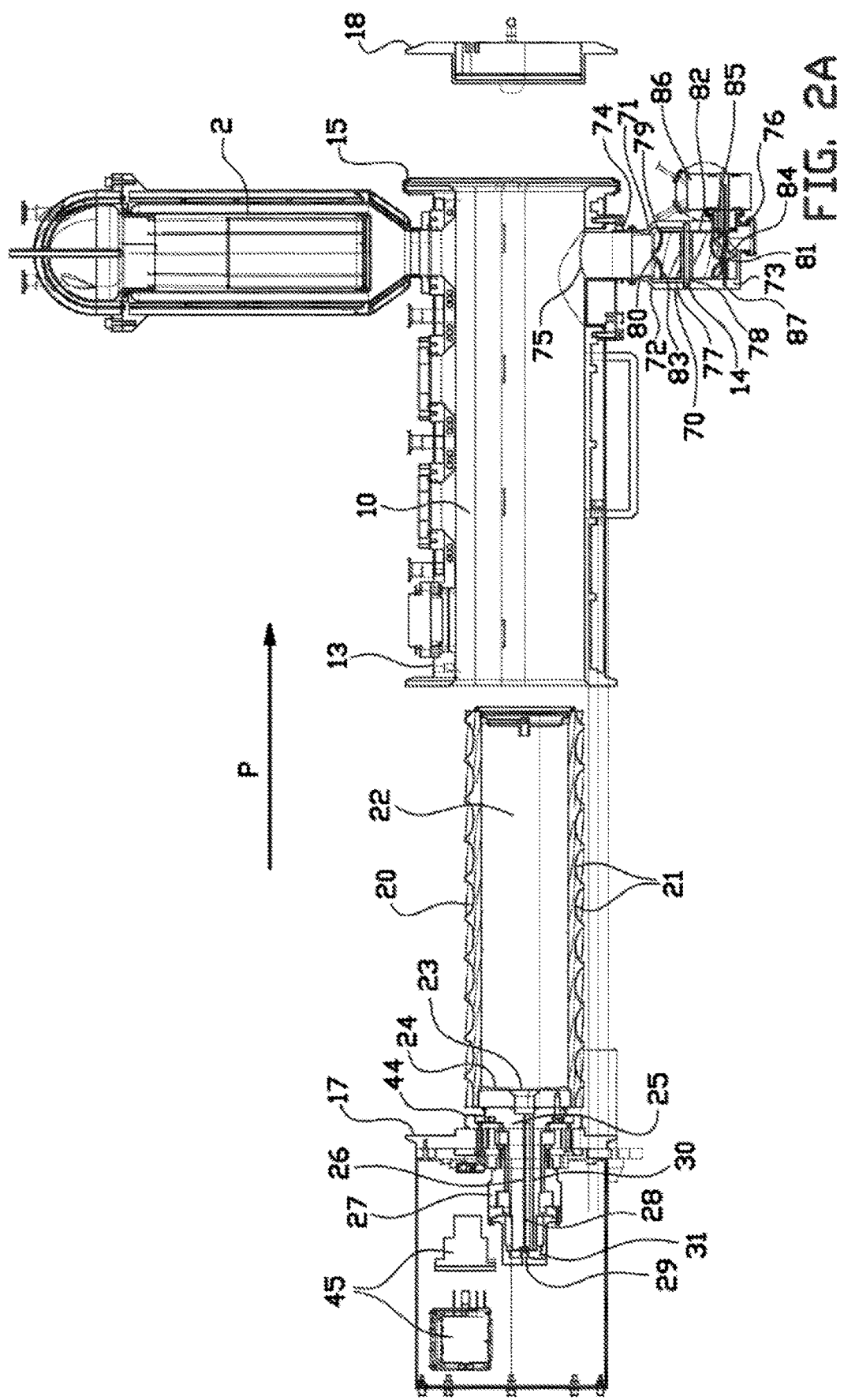
FIGS. 2A-2B show a cross-section view of the drying device according to plane IIA and a cross-section view of the drying device according to plane IIB, respectively.
Figure 2B:
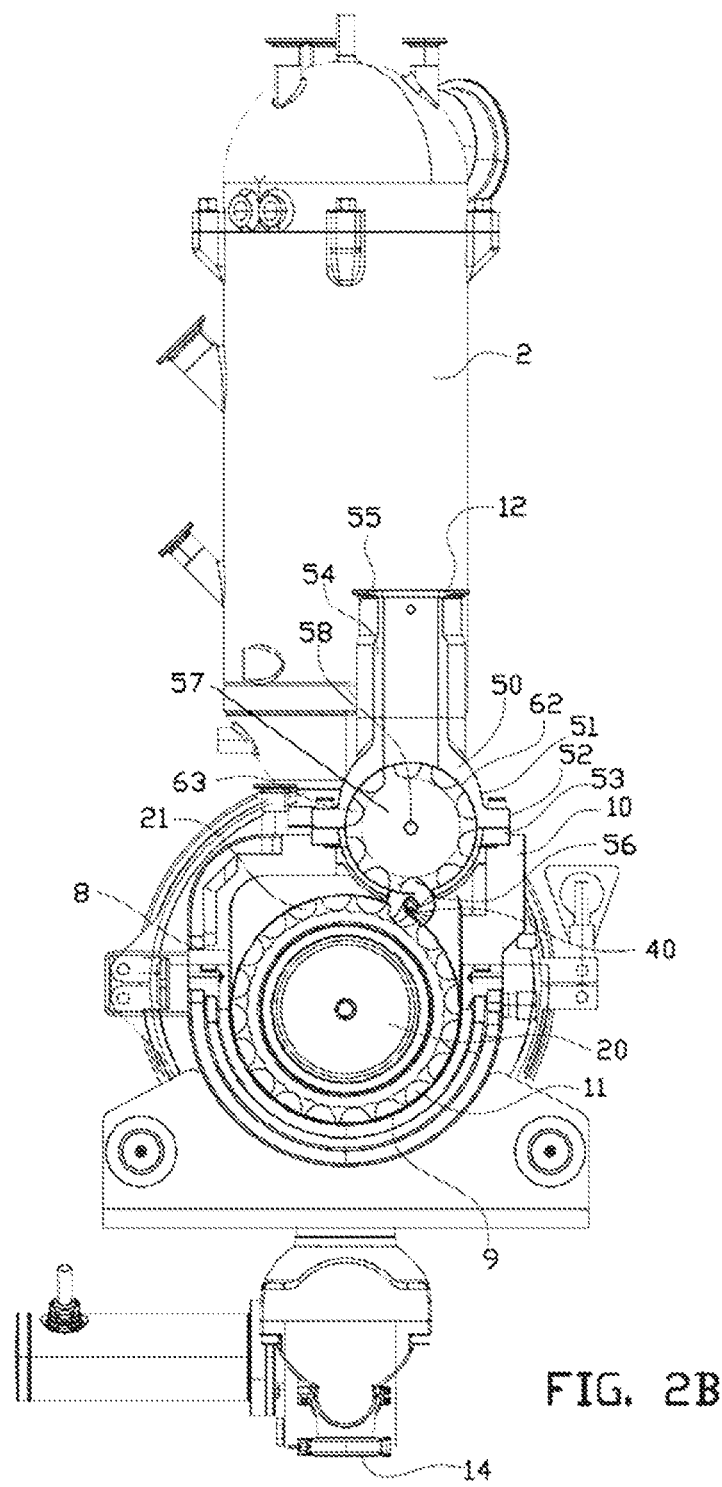

A drying device 1 according to an embodiment of the invention is shown in FIGS. 1A-1C and 2A-2B. The drying device 1 comprises a housing 10 in which a drying chamber 11 is defined. The housing 10 is provided with an inlet 12 at a first end 13 of the housing, wherein the inlet 12 is configured for introducing product to be dried into the drying chamber 11 of the housing 10. The housing 10 is also provided with an outlet 14 at a second end 15 opposite to the first end 13 of the housing 10. The outlet 14 is configured for discharging dried product from the drying chamber 11. The housing 10 has a first closing lid 17 at the first side 13 and a second closing lid 18 at the second side 15 of the housing 10 in order to close off the drying chamber 11. The drying chamber 11 is trough-shaped as shown in FIGS. 1B and 2B.

A support bracket 4 is attached to the housing 10, which support bracket 4 is provided with two sliding rails 5 extending from the support bracket 4 towards and beyond the first side 13 of the housing 10. The first closing lid 17, and the parts connected thereto, is connected slidable to the sliding rails 5. The first closing lid 17 can be slid along the sliding rails 5 in order to get access to the drying chamber 11, as is shown in FIG. 1B.

As shown in FIGS. 1A-1B, the drying device 1 further comprises a particulate filter 2 attached to an exhaust port 16 of the housing 10, which particulate filter may be connected to non-shown gas extraction equipment, such as a vacuum pump. The particulate filter 2 is in fluid communication with the drying chamber 11 via the exhaust port 16 and is configured for preventing particles from leaving the drying device 1, at least during creating a vacuum within the drying chamber 11.

The drying device 1 further comprises a drying rotor 20 having a plurality of helical grooves 21. In the context of the present application, helical has to be understood as spiraling around the longitudinal axis thereof. The drying rotor 20 is arranged rotatable within the drying chamber 11 of the housing 10 about a rotation axis K and attached rotatable to the first closing lid 17 of the housing 10. The helical grooves 21 of the drying rotor 20 are extending over the outer surface of the drying rotor 20, thereby forming a toothed outer surface of the drying rotor 20 with a plurality of teeth 19. Each of the helical grooves 21 does extend over a partial revolution in the circumferential direction of the drying rotor 20. The outer surface of the drying rotor 20 is increased by providing the helical grooves 21 in comparison with a non-shown drying rotor with a smooth outer surface.

As shown in FIG. 2A, a fluid chamber 22 is defined within the drying rotor 20. The fluid chamber 22 is adapted for holding a heat exchange fluid which is in thermal contact with the outer surface of the drying rotor 20. At a side face 24, the fluid chamber 22 has a fluid opening 23 for introducing the heat exchange fluid into the fluid chamber 22 or to enable the heat exchange fluid to exit the fluid chamber 22. A rotating fluid connector 25 is coupled to the side of the side face 24 facing away from the fluid chamber 22. The rotating fluid connector 25 comprises a rotating part 26 connected to the drying rotor 20 and a stationary part 27 connected to the first closing lid 17 of the housing 10. Because of the rotating fluid connector 25, the drying rotor 20 is enabled to rotate with respect to the first closing lid 17. A first fluid channel 28 is provided within the rotating part 26, which is in fluid communication with a first fluid port 29 within the stationary part 27. A second fluid channel 30 is provided within the rotating part 26, which is in fluid communication with a second fluid port 31 within the stationary part 27. The first fluid port 29 and the second fluid port 31 are configured for supplying heat exchange fluid to the fluid chamber 22 and to remove heat exchange fluid from the fluid chamber 22, respectively. The first and second fluid ports 29, 31 can be connected to a non-shown heat exchange system.

As shown in FIG. 2B the drying chamber 11 has a substantially trough-shaped cross-section, wherein the drying rotor 20 is positioned in the lower part of the drying chamber 11. The drying rotor 20 has an outer diameter DR and the drying chamber 11 is dimensioned, such that the teeth 19 of the drying rotor 20 are enabled to scrape the inner wall 8, in particular the inner bottom wall 9, of the drying chamber 20 when the drying rotor 20 is arranged within the drying chamber 11. By scraping the inner wall 8, in particular the inner bottom wall 9, a product to be dried inserted into the drying device 1 is prevented from staying behind or staying stuck to the inner wall 8 or the inner bottom wall 9.

As shown in FIGS. 1B-1C the drying device 1 further comprises a screw 40 having a shaft 41 and a flight 42 provided spiraling around and at an outer surface of the shaft 41. The shaft 41 is provided with a first connecting end 43 at a first side thereof, wherein the first connecting end 43 is adapted to be rotatable received within a first connecting channel 44 arranged at the first closing lid 17 of the housing 10, in particular at the side of the first closing lid 17 facing the drying chamber 11. The first connecting end 43 of the screw 40 is operatively connected to a magnetic drive 45 which is partially shown in FIG. 2A. The magnetic drive 45 is configured for driving the screw 40 in rotation. By providing the magnetic drive 45 for driving the screw 40, the screw 40 can be driven without the need for providing a physical linkage between the magnetic drive 45 and the screw 40. Any leakage problems which may arise with such a physical linkage are thereby avoided. The screw 40 further includes a second connecting end 46 configured for being received rotatable within a second connecting channel 47 provided at the second closing lid 18 of the housing, in particular at the side thereof facing the drying chamber 11. The screw 40, thus, is rotatable received within the first and second connecting channels 44, 47 and enclosed between the first closing lid 17 and the second closing lid 18 of the housing 10.

As shown in FIGS. 1C and 2B the screw 40 is arranged substantially parallel to the drying rotor 20. The screw 40 and the drying rotor 20 are arranged, such that the flight 42 of the screw 40 engages into one or more of the helical grooves 21 of the drying rotor 20. The flight outside diameter, the shaft outer diameter and the depth of the helical grooves 21 are chosen such that the circumference of the flight 42 of the screw 40 is directly adjacent to or into contact with at least the bottom of the one or more helical grooves 21.

The screw 40 extends beyond the drying rotor 20 in a drying direction P extending from the first end 13 of the housing 10 to the second end 15 of the housing 10. A space is defined between the end of the drying rotor 20 facing the second closing lid 18 of the housing 10 and the second closing lid 18. Dried product is removed from the drying rotor 20 and transported into the space at the end of the drying rotor 20 facing the second closing lid 18 of the housing 10 by means of the screw 40. Optionally, at least one tooth 119 of the drying rotor 20 also extends beyond the drying rotor 20 in the drying direction P and into the space at the end of the drying rotor 20 facing the second closing lid 18 of the housing 10 by means of the screw 40. By means of the extending tooth 119, product within the space is prevented from sticking to the walls of the drying chamber, defining the space. During use, the screw 40 is driven in rotation by means of the magnetic drive 45. Because of the screw 40 being engaged into one or more helical grooves 21, a rotating movement of the screw 40 can be transferred to the drying rotor 20. The drying rotor 20 is then also driven in rotation by means of the magnetic drive 45 via the screw 40.

It is possible that, during use, product to be dried gets stuck at the surface of the helical grooves 21. As the circumference of the flight 42 of the screw 40 is directly adjacent to or into contact with at least the bottom of the engaged helical grooves 21, any product stuck within the respective helical groove 21 is scraped from the respective groove 21 by the flight 42 of the screw 40 when the screw is driven in rotation.

Additionally, as the flight 42 of the screw 40, during use, moves through the helical grooves 21 of the drying rotor 20, the product present within the helical grooves 21 of the drying rotor 20 is pushed forward within the respective helical groove 21 in the drying direction P extending between the first side 13 and the second side 15 of the housing. After being pushed forward, the product to be dried makes at least one revolution around the rotation axis K of the drying rotor 20 while remaining in the respective helical groove 21. After the at least one revolution, the product to be dried abuts against the screw 40 and is pushed forward again. These steps are repeated until the product to be dried reaches the outlet 14 of the housing 10. The product to be dried is basically moved through the drying chamber 11 step-by-step, therewith enabling to extend the length of stay of the product within the drying chamber 11.

As shown in FIG. 2B, a rotary valve 50 is provided at the inlet 12 of the drying device 1. The rotary valve 50 comprises a circular housing 51 with an upper part 52 and a lower part 53. The upper part 52 is provided with an inlet duct 54 with an inlet opening 55 for inserting product to be dried into the circular housing 51 of the rotary valve 50. The lower part 53 is provided with an outlet opening 56 for enabling product to be dried to exit the rotary valve 50 and to enter the drying chamber 11. A valve rotor 57 is arranged rotatable around a first valve rotation axis 58 within the circular housing 51. As shown in FIG. 1C the valve rotor 57 comprises a plurality of helical grooves 59 at the outer surface thereof. The plurality of helical grooves 59 forms a plurality of teeth 60 between the helical grooves 59. The rotary valve 50 is shaped, such that the tops 61 of the teeth 60 are directly adjacent to an inner wall 62 of the circular housing 51, wherein the inner wall 62 defines a valve chamber 63 in which the valve rotor 57 is arranged. The inlet duct 54 ends at the circumference of the valve rotor 57, therewith preventing that air can flow freely into the drying chamber 11.

A rotary valve 70 is also provided as the outlet 14 of the drying device 1. The rotary valve 70 comprises a circular housing 71 with an upper part 72 and a lower part 73. The upper part 72 is provided with an inlet duct 74 with an inlet opening 75 for allowing dried product to enter the circular housing 71 of the rotary valve 70. The lower part 73 is provided with an outlet opening 76 for enabling product to be dried to exit the rotary valve 70. A valve rotor 77 is arranged rotatable around a first valve rotation axis 78 within the circular housing 71. The valve rotor 77 comprises a plurality of helical grooves 79 at the outer surface thereof. The plurality of helical grooves 79 forms a plurality of teeth 80 between the helical grooves 79. The rotary valve 70 is shaped, such that the tops 81 of the teeth 80 are directly adjacent to an inner wall 82 of the circular housing 71, wherein the inner wall 82 defines a valve chamber 83 in which the valve rotor 77 is arranged. A valve screw 84 having a valve flight 85 is provided downstream of the valve rotor 77. The valve screw 84 is operatively connected to a driving mechanism 86 for driving the valve screw 84 in rotation around a further valve rotation axis 87. The valve screw 84 is arranged parallel to the valve rotor 77. The valve screw 84 and the valve rotor 77 are configured, such that the valve flight 85 engages into one or more of the helical grooves 79 of the valve rotor 77. The valve screw 84, therefore, can be used for driving the valve rotor 77 in rotation and/or to scrape dried product from the one or more helical grooves 79 of the valve rotor 77.

Because of the valve rotors 50, 70, it is possible to apply a vacuum within the drying chamber 11 which is generated by a vacuum pump connected to the particulate filter 2.

Figure 3:
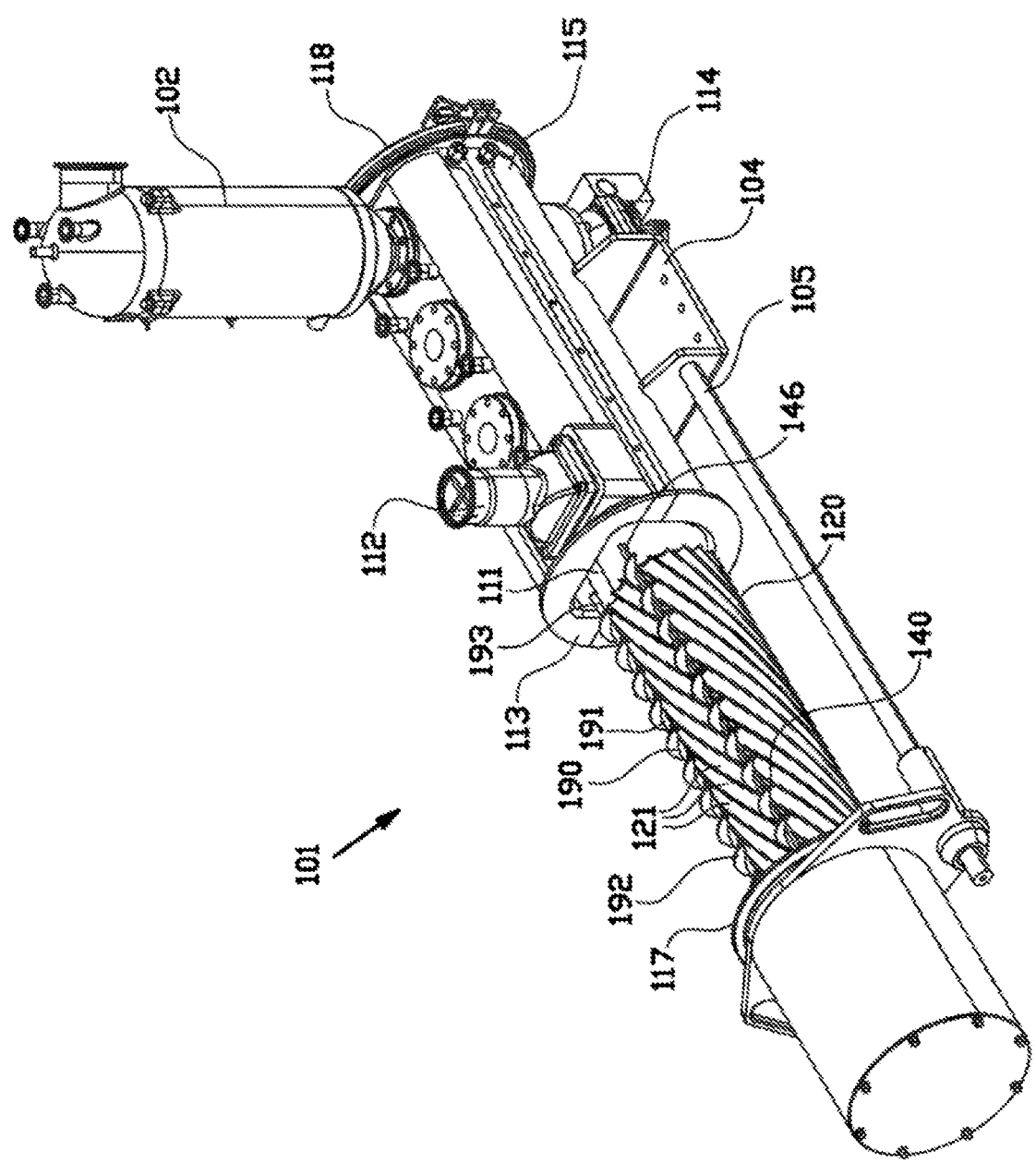
FIG. 3 shows an isometric exploded view of the drying device with a drying rotor, a screw and an additional screw according to another embodiment of the invention.

Another embodiment of the drying device 101 is shown in FIG. 3. The drying device 101 comprises substantially the same features as the drying device 1 as shown in FIGS. 1A, 1B, 1C, 2A and 2B, wherein corresponding features are referred to by the same reference number but increased by 100, for example, particulate filter 102, support bracket 104, sliding rails 105, drying chamber 111, inlet 112, first end 113, outlet 114, second end 115, first closing lid 117, second closing lid 118, drying rotor 120, and helical grooves 121. For the sake of brevity, corresponding features are not introduced again.

The drying device 101 further comprises a second screw 190 with a shaft 191 and a flight 192 provided spiraling around and at an outer surface of the shaft 191. The shaft 191 is rotatable connected to the first closing lid 117 of the housing 110, in particular at the side of the first closing lid 117 facing the drying chamber 111. The additional screw 190 is operatively connected to the magnetic drive 145 or to a non-shown additional magnetic drive for driving the additional screw 190 in rotation. The additional screw 190 further includes a second connecting end 193 configured for being received rotatable within a second connecting channel 194 provided at the second closing lid 118 of the housing, in particular at the side thereof facing the drying chamber 111.

As shown in FIG. 3 the additional screw 190 is arranged substantially parallel to the drying rotor 120. The additional screw 190 and the drying rotor 120 are arranged, such that the flight 192 of the additional screw 190 engages into one or more of the helical grooves 121 of the drying rotor 120. In accordance with the screw 140, the additional screw 190 can be used, during use, for: driving the drying rotor 120 in rotation by transferring the rotation movement of the additional screw 190 to the drying rotor 120; scraping any product stuck within a respective helical groove 121 by the flight 192 of the additional screw 190 when the screw is driven in rotation; and/or pushing forwards product to be dried within a respective helical groove 121 of the drying rotor 120.

The additional screw 190 can be used as an addition to the screw 140, or to take over one of the functions of the screw 140.

Another embodiment of the drying device 401 according to the invention is schematically shown in FIG. 4A. The shown drying device 401 has substantially the same features as the drying device 1 as shown in FIGS. 1A-1C, and re-introduction of corresponding features is omitted.

As best shown in FIGS. 4A and 4B the drying device 401 comprises a drying rotor 420 with a number of helical grooves 421 provided at the outer surface of the drying rotor 420. A screw 440 with a flight 441 is placed adjacent to the drying rotor 420, such that the flight 441 engages into the helical grooves 421 of the drying rotor 420. The product outlet of the drying device 401 comprises a rotary valve with a valve rotor 477. The valve rotor 477 has a plurality of helical grooves 479 provided at the outer surface thereof. An outlet screw 484 with a flight 485 is located between the drying rotor 420 and the valve rotor 477, such that the flight 485 engages into the helical grooves 479 of the valve rotor 477 and the helical grooves 421 of the drying rotor 420. The outlet screw 484 extends over a part of the drying rotor 420 in the longitudinal direction thereof and is configured for removing the product from the helical grooves 421 of the drying rotor 420 and for introducing the product into the rotary valve.

Figure 5A:
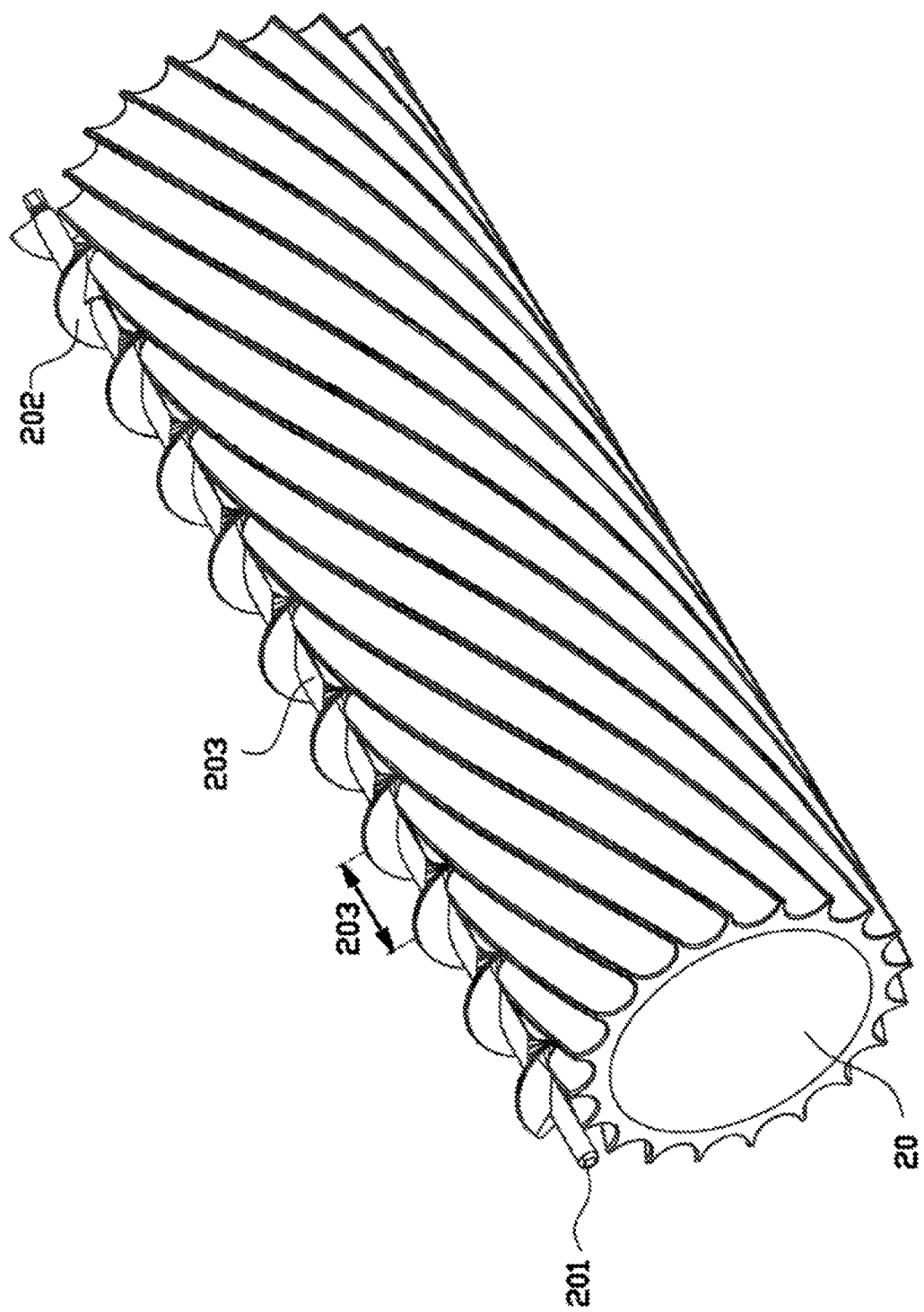

Different alternatives of screws to be used in a drying device according to an embodiment of the invention are shown in FIGS. 5A-5F, in which figures the drying rotor 20 is included for the sake of clarification. FIG. 5A shows a first alternative of a screw 200. The screw 200 comprises a shaft 201 and a flight 202 which is arranged spiraling around the shaft 201. The screw 200 is also called a screw 200 with full pitch 203 segments. As indicated, a helix angle α between the shaft 201 and the flight 202 is about 90°.

Figure 5B:
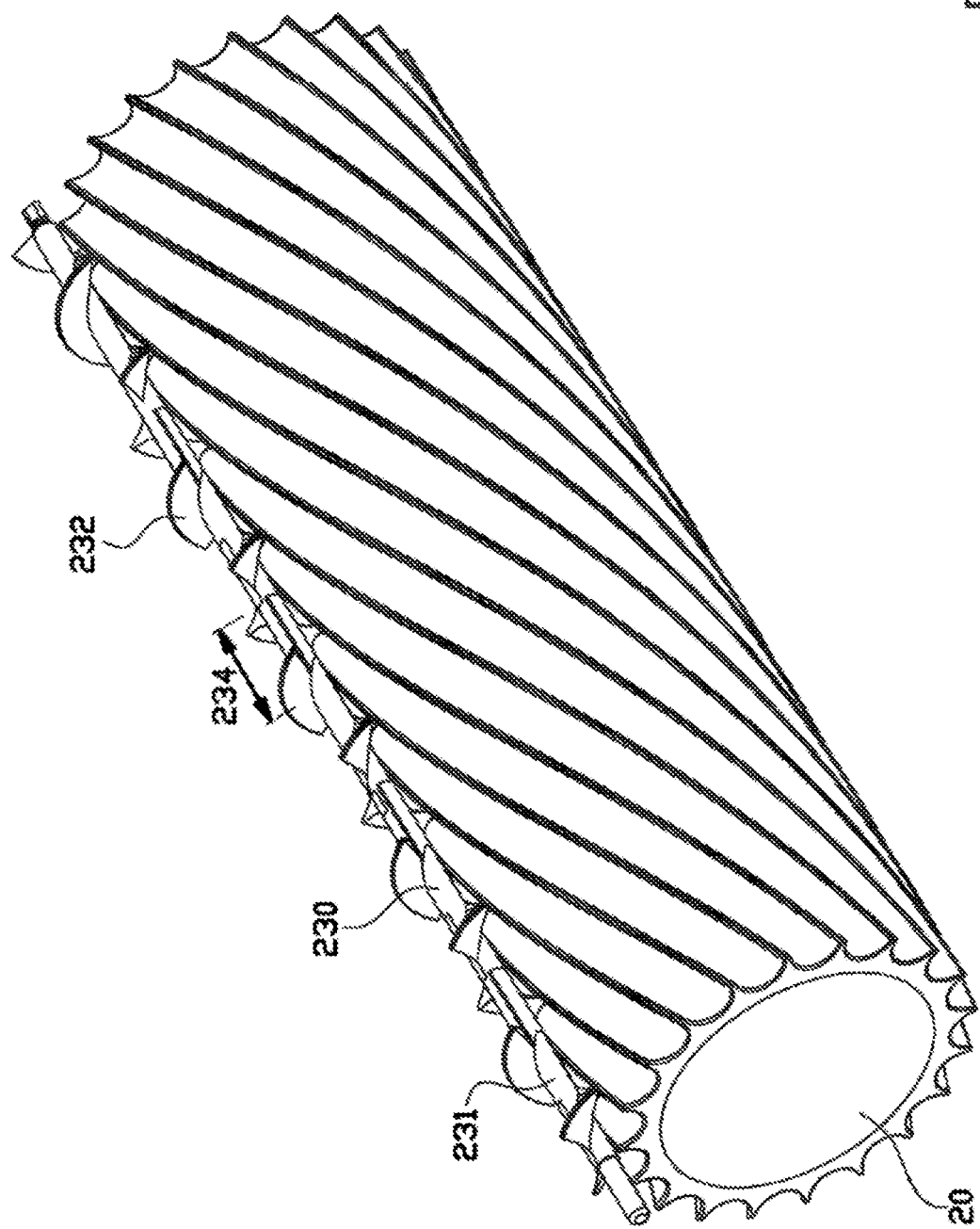

An alternative of the screw 230 is shown in FIG. 5B. The screw 230 comprises a shaft 231 and a flight 232 which is arranged spiraling around the shaft 231. The screw 230 is a screw 230 with an interrupted flight 232, in particular a screw 230 with three quarter pitch 233 segments. This has to be understood as that the flight 232 extends over three quarter of a pitch 234 and then is absent for a quarter of the pitch 234. By using the screw 230 with three quarter pitch 233 segments, the open area for the product has increased in comparison with the screw 200 of FIG. 4A. The larger the open area for the product to pass the screw, the longer the duration of stay of a product to be dried within a drying device can be increased.

Figure 5C:
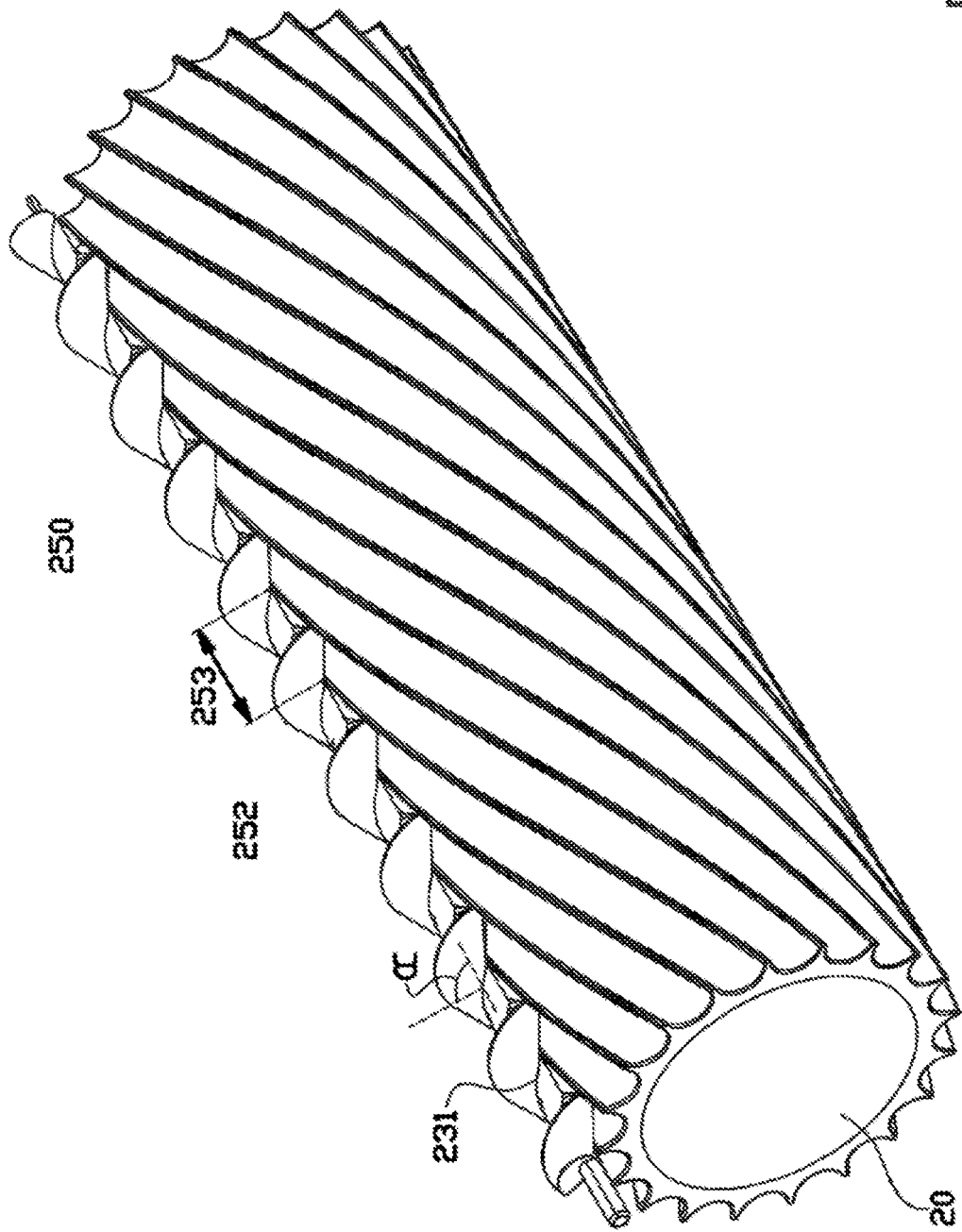

A further alternative of the screw 250 is shown in FIG. 5C. The screw 250 comprises a shaft 251 and a flight 252 which is arranged spiraling around the shaft 251. The screw 250 has full pitch 253 segments. As indicated, a helix angle α between the shaft 251 and the flight 252 is smaller than 90°. Because of the smaller helix angle α, the amount of pushing forward material within a helical groove is increased.

Another alternative of a screw 260 is shown in FIG. 5D. The screw 260 comprises first and second connectors 261 for connecting the screw 260 rotatable to a non-shown driving mechanism and/or to a non-shown connecting channel. The screw 260, further, is provided with a coreless flight 262 secured to the first and second connectors 261. Because of the coreless flight 262, the screw 260 has a large open area through which product can pass, and thus has an increased duration of stay.

Figure 5E:
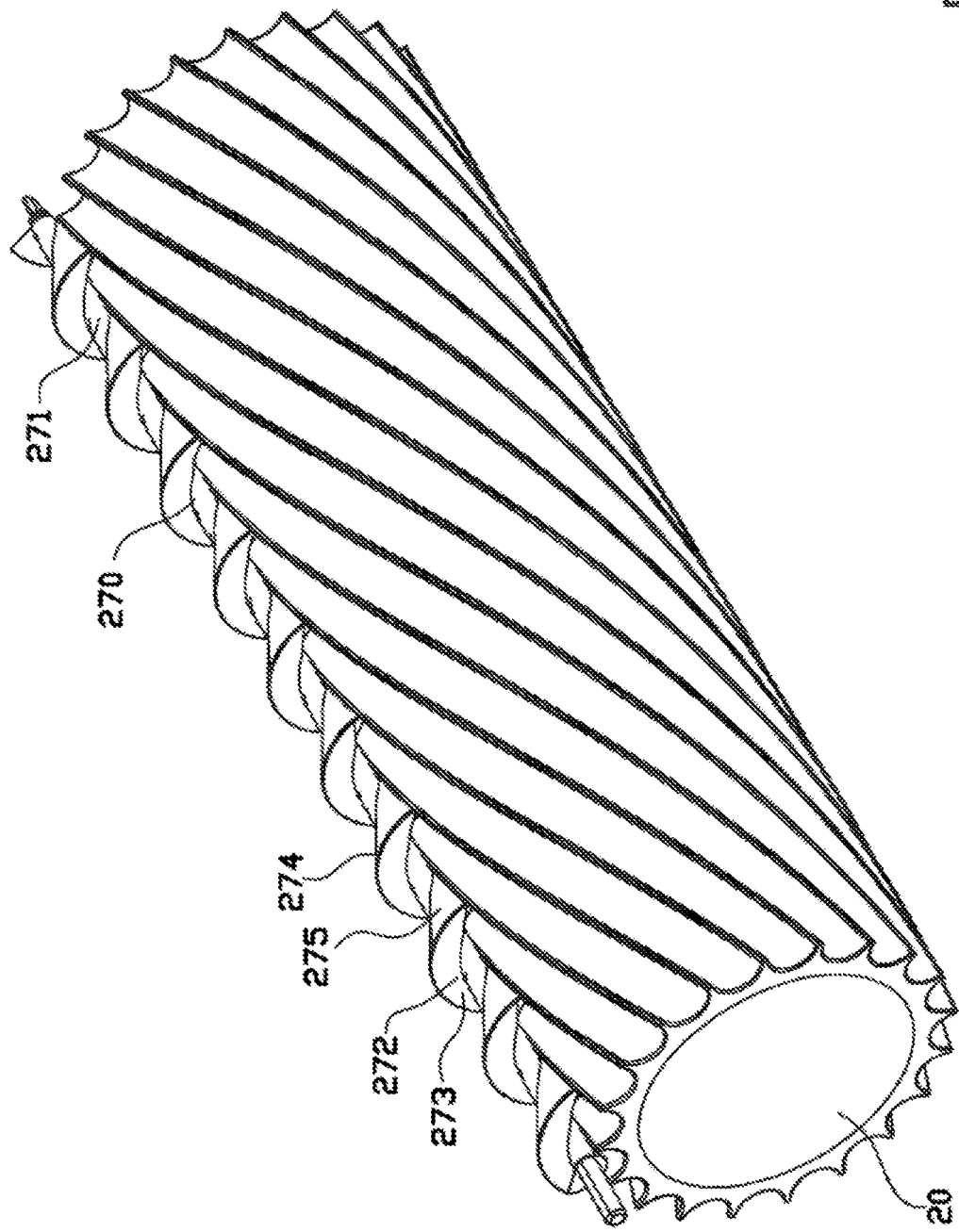

FIG. 5E shows a further alternative of a screw 270. The screw 270 includes a shaft 271 and a flight 272 which is arranged spiraling around the shaft 271. The flight 272 has a leading edge 273 and a trailing edge 274, wherein a wedge-shaped filler 275 is provided between the trailing edge 274 and the shaft 271. Because of the wedge-shaped filler 275 the open area through which product can pass, is reduced in comparison with, for example, the screw 260 as shown in FIG. 5D. Due to the reduced open area, less product can pass through the screw 270 and, therefore, the forward movement of the product is increased. The higher the forward movement of the product, the shorter the duration of stay of the product within the housing 10.

Figure 5F:
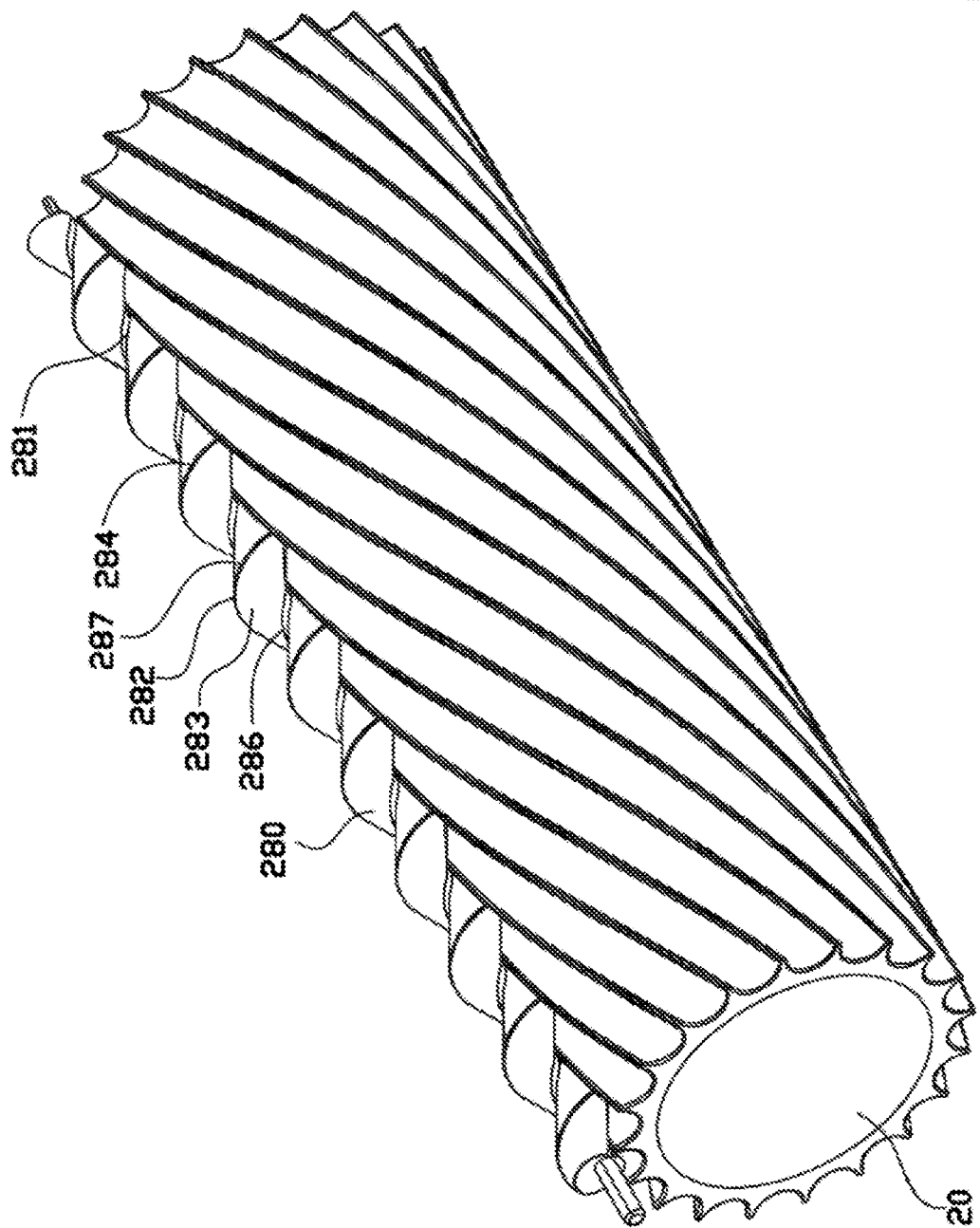

Another alternative of a screw 280 is shown in FIG. 5F. The screw 280 has a shaft 281 and a flight 282 arranged spiraling around the shaft 281. The flight 282 has a leading edge 283 and a trailing edge 284, wherein a first wedge-shaped filler 286 is provided between the leading edge 283 and the shaft 281 and a second wedge-shaped filler 287 is provided between the trailing edge 284 and the shaft 281. Compared with the screw 270 shown in FIG. 5E, the open area of the screw is reduced, whereby the forward movement of the product is increased.

Further alternatives of screws to be used wherein aspects of the screw, such as channel width, flight diameter, channel flight, etc. can be modified, are possible within the scope of the invention.

Figure 6B:
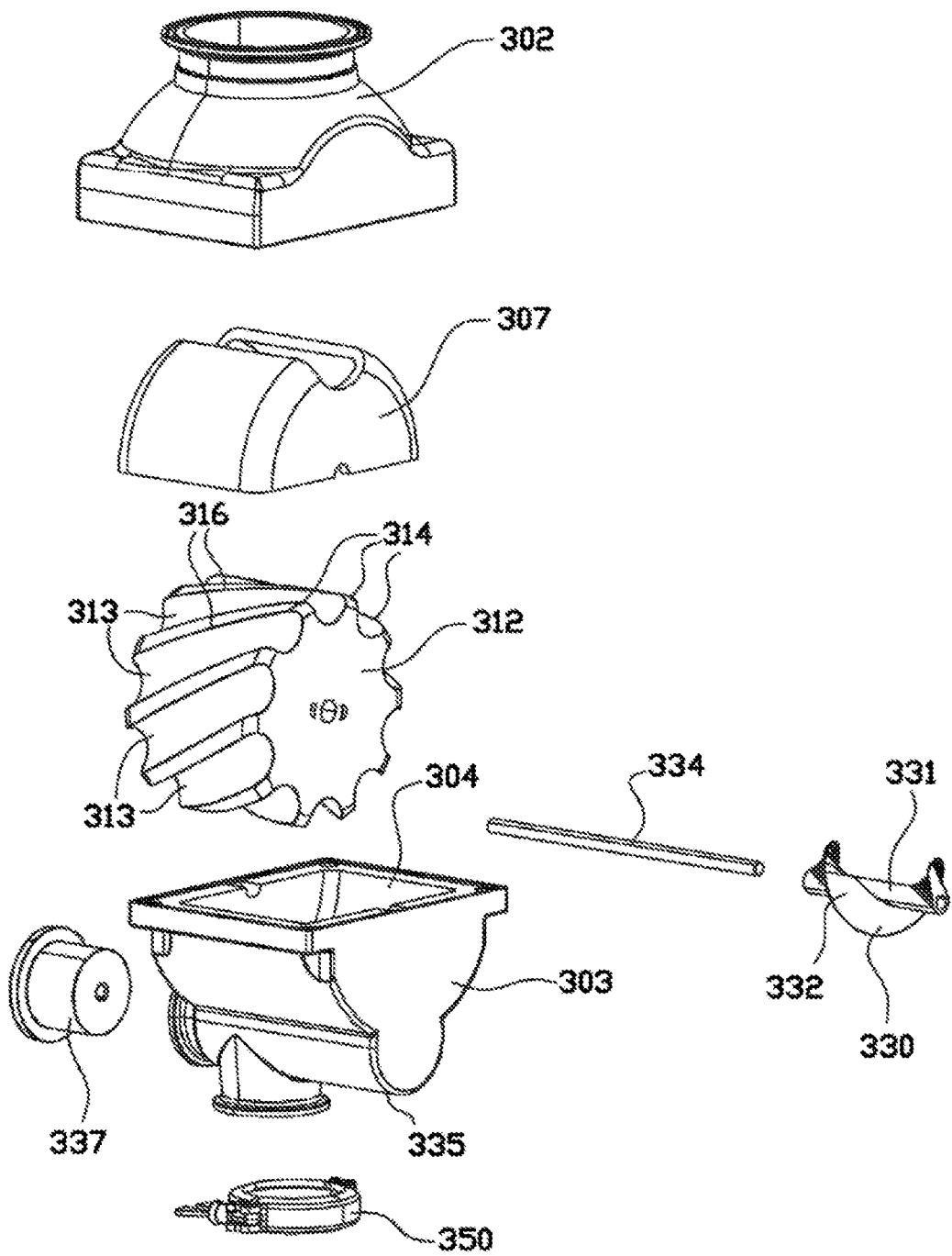
Figure 6C:
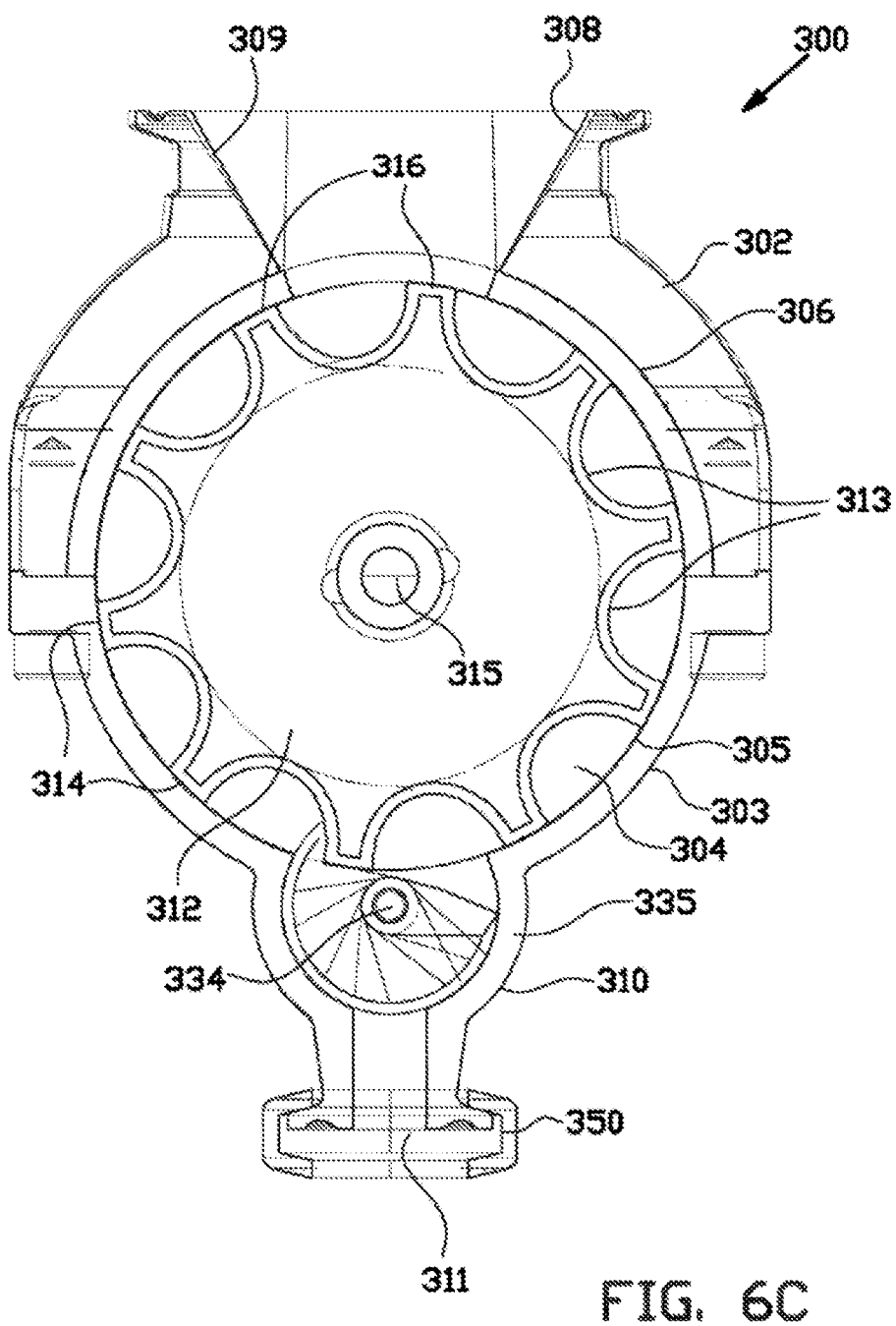

An embodiment of a rotary valve 300 according to the invention is shown in FIGS. 6A-6C. The rotary valve 300 comprises a circular housing 301 with an upper housing part 302 and a lower housing part 303. A rotor chamber 304 is defined within the circular housing 301, which rotor chamber 304 is delimited by a lower chamber inner wall 305 of the lower housing part 303 and an upper chamber inner wall 306 of the upper housing part 302. An additional housing member 307 is provided at the upper chamber inner wall 306 of the upper housing part 302. The upper housing part 302 has an inlet channel 308 with an inlet opening 309 for inserting a material into the rotary valve 300 and in fluid communication with the rotor chamber 304. The lower housing part 303 has an outlet channel 310 with an outlet opening 311 for enabling an inserted material to exit the rotary valve 300 and in fluid communication with the rotary chamber 304.

The rotary valve 300 further comprises a valve rotor 312 having a plurality of helical grooves 313 at the outer surface thereof. Because of the helical grooves 313, the outer surface of the valve rotor 312 comprises a plurality of teeth 314. The valve rotor 312 is arranged rotatable around a first valve rotation axis 315 within rotor chamber 304. As shown in FIG. 6C the rotary valve 300 is dimensioned, such that the tops 316 of the teeth 314 are directly adjacent to the additional housing member 307 and the lower chamber inner wall 305 of the lower housing part 303. The inlet channel 308 ends at the circumference of the valve rotor 312, therewith preventing that air or a material can flow freely through the rotary valve 300.

As shown in FIGS. 6B-6Cc a valve screw 330 is provided within the outlet channel 310 downstream of the valve rotor 312 and upstream and upstream of the outlet opening 311. The outlet channel 310 comprises a circular channel part 335 for receiving the valve screw 330. The valve screw 330 has a valve screw shaft 331 and a valve screw flight 332 arranged helically around and at the outer surface of the valve screw shaft 331. A rotation spindle 334 extends through the valve screw shaft 331, which rotation spindle 334 is operatively connected to a magnetic drive 336 via a drive coupling 337, e.g. a magnetic drive coupling 337. The magnetic drive 336 is configured for driving the rotation spindle 334 in rotation and comprises a non-shown magnet for transferring a rotation movement of the magnetic drive 336 to the rotation spindle 334 via the drive coupling 337.

As shown in FIG. 6C the valve screw 330 is arranged parallel to the valve rotor 312. The valve screw 330 and the valve rotor 312 are configured, such that the valve screw flight 332 engages into one or more of the helical grooves 313 of the valve rotor 312. When the valve screw 330 is driven in rotation by the magnetic drive 336 around the rotation spindle 334, the rotational movement of the valve screw 330 is transferred to the valve rotor 312 due to the engagement between the valve screw 330 and the valve rotor 312. The valve screw 330, therefore, can be used for driving the valve rotor 312 in rotation.

Additionally, it can be seen in FIG. 6C that the valve screw flight 332 moves through the helical grooves 313 of the valve rotor 312 during driving of the valve rotor 312. As the valve screw flight 332 moves through each of the helical grooves 313, the valve screw 330 may remove and/or any material from the respective helical groove 313 through which it is currently moving. It is therewith prevented that any material remains stuck within the helical grooves 313, therewith increasing the efficiency of the valve rotor 300.

As shown in FIGS. 6B-6C the rotary valve 300 is further provided with a clamp 350. The clamp 350 is configured for, for example, clamping a non-shown transport duct or a non-shown collecting bag to the outlet channel 310 of the rotary valve 300. Any material exiting the rotary valve 300, therefore, may be received in the transport duct for transport to a further processing device or in the collecting bag for storage of the material.

It is noted that aspects mentioned in relation to the drying device, such as variants of the screw, are also applicable in relation to the claimed, described and shown rotary valve, and vice versa.

It is to be understood that the above description is included to illustrate the operation of the preferred embodiments and is not meant to limit the scope of the invention. From the above discussion, many variations will be apparent to one skilled in the art that would yet be encompassed by the scope of the present invention.

The invention claimed is:

1. A drying device for drying a product, the drying device comprising:
   a housing having a drying chamber defined therein, and having a product inlet at a first end and a product outlet at a second end;
   a drying rotor being arranged rotatable within the drying chamber, wherein the drying rotor comprises a plurality of helical grooves arranged at the outer surface thereof and adjacent to each other in the direction of the circumference;
   a screw having a flight with a flight channel there between, wherein the screw is arranged rotatable within the drying chamber and substantially parallel to the drying rotor;
   a driver operatively connected to at least the screw, the driver being configured to drive the screw in rotation around a screw axis; and
   a heater for providing thermal energy to at least a part of the drying chamber in order to dry the product present within the drying chamber,
   wherein the drying rotor and/or the screw at least are configured for moving the product from the first end to the second end,
   wherein the screw and the drying rotor are configured such that the flight of the screw engages into multiple helical grooves of the drying rotor,
   wherein the screw and the drying rotor are configured such that, during use, the screw scrapes over the surface of the multiple helical grooves.

2. The drying device according to claim 1, wherein the screw and the drying rotor are configured such that the drying rotor is driven in rotation by the screw when the screw is driven in rotation.

3. The drying device according to claim 1, wherein the drying rotor is configured to move the product in rotation around a rotor axis parallel to the screw axis, and wherein the screw is configured to push the product in a direction from the first end to the second end.

4. The drying device according to claim 1, wherein the at least one helical groove has a groove depth, or the at least one helical notch has a notch height, and the screw has a channel depth,
   wherein the groove depth or the notch height is substantially equal to the channel depth.

5. The drying device according to claim 1, wherein the drying rotor has an upper part and a lower part and the drying chamber is substantially trough-shaped.

6. The drying device according to claim 5, wherein the screw is arranged adjacent to the upper part of the drying rotor.

7. The drying device according to claim 1, further comprising an additional screw having an additional flight with an additional flight channel there between, wherein the additional screw is arranged rotatable within the drying chamber and substantially parallel to the drying rotor.

8. The drying device according to claim 7, wherein the additional screw is arranged adjacent to the upper part of the drying rotor.

9. The drying device according to claim 7, wherein the screw and/or the additional screw are selected from the group comprising a screw with full pitch segments, a screw with half pitch segments, and a screw with three quarter pitch segments, and/or
   wherein the flight of the screw and/or the additional flight of the additional screw have a helix angle, wherein the helix angle is an acute angle.

10. The drying device according to claim 1, further comprising at least one rotary valve provided at the product inlet and/or the product outlet of the drying device.

11. The drying device according to claim 10, wherein the rotary valve comprises a valve housing with a product inlet,
wherein the housing has a substantially cylindrical chamber defined therein, and a valve rotor arranged rotatable within the substantially cylindrical chamber, wherein the valve rotor is provided with a plurality of helical grooves at the outer surface thereof.

12. The drying device according to claim 11, wherein when the rotary valve is placed at the inlet of the drying device, the rotary valve is positioned such that the screw engages into at least one of the helical grooves of the valve rotor.

13. The drying device according to claim 11, wherein when the rotary valve is placed at the product outlet of the drying device, the rotary valve further comprises a valve screw having a valve flight with a valve flight channel there between, and a valve driver operatively connected to the valve screw and configured to drive the valve screw in rotation,
wherein the valve screw is arranged rotatable within the valve housing and substantially parallel to the valve rotor, wherein the valve screw and the valve rotor are configured such that the valve flight of the valve screw engages into at least one helical groove of the valve rotor.

14. The drying device according to claim 1, wherein the drying rotor has a rotor diameter and the screw has a screw diameter, wherein the rotor diameter is larger than the screw diameter.

15. The drying device according to claim 1,
wherein the heater is provided at least partially within the drying rotor, and/or
wherein the heater comprises fluid conduits provided within the drying rotor and configured for being connected with a heat exchange fluid source, and/or
wherein the heater is provided at least partially around the drying chamber, and/or
wherein the drying device further comprises an additional driver operatively connected to the drying rotor, wherein the additional driver is configured for driving to drive the drying rotor in rotation.

16. The method for drying a product by means of a drying device according to claim 1, wherein the method comprises the steps of:
introducing a product to be dried into the drying chamber of the drying device;
moving and agitating the product within the drying chamber in a direction from the product inlet to the product outlet, while thermal energy is provided to at least a part of the drying chamber; and
discharging dried product from the product outlet,
wherein the step of moving and agitating the product within the drying chamber comprises the step of scraping over the surface of the at least one helical groove or the at least one helical notch by means of the screw.

17. The method according to claim 16, wherein the step of moving and agitating the product within the drying chamber comprises the step of driving the screw in rotation, and/or
wherein the step of moving and agitating the product within the drying chamber comprises the step of forcing the product in a direction from the first end to the second end by means of the screw.

18. A rotary valve comprising:
a housing having a product inlet and a product outlet, wherein a substantially cylindrical chamber is defined within the housing and between the product inlet and the product outlet;
a valve rotor arranged rotatable within the substantially cylindrical chamber, wherein the valve rotor is provided with a plurality of helical grooves at the outer surface thereof;
a valve screw having a valve flight with a valve flight channel there between, wherein the valve screw is arranged rotatable within the substantially cylindrical chamber and substantially parallel to the valve rotor; and
a valve driver operatively connected to the valve screw, wherein the valve driver is configured to drive the valve screw in rotation,
wherein the valve screw and the valve rotor are configured such that the valve flight of the valve screw engages into at least one helical groove of the valve rotor, and
wherein the valve screw and the valve rotor are configured such that, during use, the valve screw scrapes over the surface of at least one helical groove.

19. The rotary valve according to claim 18, wherein the valve screw and the valve rotor are configured such that the valve rotor is driven in rotation by the valve screw when the valve screw is driven in rotation, and/or
wherein the valve screw is arranged between the valve rotor and the product outlet.

20. The rotary valve according to claim 18, further comprising an additional valve driver operatively connected to the valve rotor, wherein the additional valve driver is configured to drive the valve rotor in rotation.

* * * * *